(12) United States Patent
Lutz

(10) Patent No.: US 8,874,909 B2
(45) Date of Patent: Oct. 28, 2014

(54) SYSTEM AND METHOD OF STORING DATA

(71) Applicant: Daniel Joseph Lutz, Los Angeles, CA (US)

(72) Inventor: Daniel Joseph Lutz, Los Angeles, CA (US)

(73) Assignee: Daniel Joseph Lutz, Los Angeles, CA (US)

( * ) Notice: Subject to any disclaimer, the term of this patent is extended or adjusted under 35 U.S.C. 154(b) by 46 days.

(21) Appl. No.: 13/759,014

(22) Filed: Feb. 4, 2013

(65) Prior Publication Data

US 2013/0205135 A1   Aug. 8, 2013

Related U.S. Application Data

(60) Provisional application No. 61/595,000, filed on Feb. 3, 2012.

(51) Int. Cl.
| | | |
|---|---|---|
| G06F 21/00 | (2013.01) | |
| G06F 21/62 | (2013.01) | |
| H04L 9/08 | (2006.01) | |
| H04L 9/32 | (2006.01) | |
| H04L 29/06 | (2006.01) | |
| G06F 21/32 | (2013.01) | |

(52) U.S. Cl.
CPC ........... *G06F 21/6245* (2013.01); *H04L 9/0833* (2013.01); *H04L 9/3247* (2013.01); *H04L 9/3263* (2013.01); *H04L 2209/80* (2013.01); *H04L 63/0823* (2013.01); *G06F 21/32* (2013.01)
USPC .......................................................... 713/165

(58) Field of Classification Search
CPC ... H04L 9/0833; H04L 9/3247; H04L 9/3263; H04L 63/0823; G06F 21/10
USPC .......................................................... 713/165
See application file for complete search history.

(56) References Cited

U.S. PATENT DOCUMENTS

| | | | |
|---|---|---|---|
| 7,992,198 B2 | 8/2011 | Guarraci et al. | |
| 8,074,889 B2 * | 12/2011 | Beenau et al. | ................. 235/487 |
| 2004/0221224 A1 | 11/2004 | Blattner et al. | |
| 2005/0071677 A1 | 3/2005 | Khanna et al. | |
| 2005/0177749 A1 * | 8/2005 | Ovadia | .......................... 713/201 |
| 2006/0206932 A1 | 9/2006 | Chong | |
| 2007/0157297 A1 | 7/2007 | Patrick | |
| 2008/0072300 A1 | 3/2008 | Garbow et al. | |
| 2009/0064300 A1 | 3/2009 | Bagepalli et al. | |

(Continued)

FOREIGN PATENT DOCUMENTS

| | | |
|---|---|---|
| WO | WO 2006130616 A2 * | 12/2006 |
| WO | WO 2007000761 A2 * | 1/2007 |
| WO | WO2007037590 A1 | 4/2007 |

*Primary Examiner* — Peter Shaw
*Assistant Examiner* — Ali Shayanfar
(74) *Attorney, Agent, or Firm* — Morriss O'Bryant Compagni, PC

(57) ABSTRACT

There is a system and method for storing data of others using a processor and a memory device. The system includes an account module configured to manage a plurality of accounts, each account associated with an entity. The system includes an avatar module configured to permit entities to generate avatars for their accounts, wherein an avatar associates data with an account that is not required to be consistent with the account and not required to be consistent with data in other avatars of that same account. The system includes a transaction module configured to facilitate a plurality of transactions using trusted entity data. The system includes an encryption module configured to encrypt, using a processor, the transaction data with a plurality of paired half-keys.

20 Claims, 16 Drawing Sheets

(56) References Cited

U.S. PATENT DOCUMENTS

| | | |
|---|---|---|
| 2009/0138943 A1 | 5/2009 | Kawanaka |
| 2009/0187405 A1 | 7/2009 | Bhogal et al. |
| 2009/0288148 A1 | 11/2009 | Headley et al. |
| 2009/0307021 A1 | 12/2009 | Hamilton, II et al. |
| 2009/0307488 A1 | 12/2009 | Guarraci et al. |
| 2009/0312080 A1 | 12/2009 | Hamilton, II et al. |
| 2010/0115426 A1 | 5/2010 | Liu et al. |
| 2010/0150353 A1 | 6/2010 | Bauchot et al. |
| 2010/0153722 A1* | 6/2010 | Bauchot et al. ............ 713/168 |
| 2010/0228646 A1 | 9/2010 | Heidel |
| 2010/0332827 A1 | 12/2010 | Garcia et al. |
| 2013/0064366 A1* | 3/2013 | Duprez et al. ............ 380/44 |

* cited by examiner

SYSTEM AND METHOD OF STORING DATA

CROSS-REFERENCE TO RELATED APPLICATIONS

This invention claims priority, under 35 U.S.C. §120, to the U.S. Provisional Patent Application No. 61/595,000 to Lutz et al. filed on Feb. 3, 2012, which is incorporated by reference herein in its entirety.

BACKGROUND OF THE INVENTION

1. Field of the Invention

The present invention relates to secure communication systems and methods, specifically a system and method of storing data.

2. Description of the Related Art

The storage of large amounts of data, especially for large organizations, such as but not limited to hospitals, retail chains, governments, and the like, is a critical function that is vulnerable to many problems. Failure to manage these issues can result in major problems for the operations of the organization and may even result in legal liability. Further, privacy issues become more and more important as more and more of our personal information is stored with these organizations and there is no specific promise of confidentiality. Worse, there are organizations that seek to obtain this private information for their own purposes that are often against the interests of the organizations storing the data and against the interests of the people that are the subject of the data storage.

Some improvements have been made in the field. Examples of references related to the present invention are described below in their own words, and the supporting teachings of each reference are incorporated by reference herein:

U.S. Pat. No. 8,074,889, issued to Beenau et al., discloses a system and methods for biometric security using biometrics in a transponder-reader system. The biometric security system also includes a biometric sensor that detects biometric sample and a device for verifying biometric samples. In one embodiment, the biometric security system includes a transponder configured with a biometric sensor. In another embodiment, the system includes a reader configured with a biometric sensor. The device for verifying samples compares the biometric samples with information stored on the databases.

U.S. Patent Application Publication No.: 2010/0153722, by Bauchot et al., discloses a method and system for verifying a user's identity within a virtual world environment. The verification is to be in real-time and avoids the possibility of providing credential (e.g., biometric information) that were previously authentication, by sending to the user a time-sensitive challenge and requiring the user to provide the requested credentials (e.g., biometric information) within a predetermined time period. Therefore, the present invention is best positioned for environments where trusted identification of a user is needed online to facilitate secure transactions.

U.S. Patent Application Publication No.: 2010/0150353, by Bauchot et al., discloses an apparatus and method for verifying a user, via captured biometric characteristics of the user, who is interacting online. The captured biometrics are guaranteed to be captured in real-time, and avoids the possibility of providing biometrics that were previously captured, by sending to the user a time-sensitive challenge and requiring the user to provide the requested biometric information within a predetermined time period. Therefore, the present invention is best positioned for environments where trusted identification of a user is needed online to facilitate secure transactions.

U.S. Patent Application Publication No.: 2010/0064359, by Boss et al., discloses an user credential verification indication in a virtual universe is disclosed. A method, system and program product are provided that include verifying a credential of the user of a first avatar in the virtual universe; and establishing a zone that causes an indication of the credential of the user of the first avatar to appear in response to an action being taken relative to the zone.

U.S. Patent Application Publication No.: 2010/0046806, by Baughman et al., discloses a system and method for virtual world biometric analytics through the use of a multimodal biometric analytic wallet. The system includes a virtual biometric wallet comprising a pervasive repository for storing biometric data, the pervasive repository including at least one of a biometric layer, a genomic layer, a health layer, a privacy layer, and a processing layer. The virtual biometric wallet further comprises an analytic environment configured to combine the biometric data from at least one of the biometric layer, the genomic layer, the health layer, the privacy layer, and the processing layer. The virtual biometric wallet also comprises a biometric analytic interface configured to communicate the biometric data to one or more devices within a virtual universe.

The inventions heretofore known suffer from a number of disadvantages which include being limited in use, being limited in application, being limited in compatibility, being limited in capabilities, being not anonymous, being not private, being unduly complex, being limited in security, exposing large amounts of data to risk by breach/crack of a single encryption key, requiring too much computational overhead, slowing access to data, making it difficult for entities to access their own data, and the like and combinations thereof.

What is needed is a system and/or method of storing data that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available systems and methods of storing data. Accordingly, the present invention has been developed to provide an effective and efficient private and secure system and/or method of storing data.

According to one embodiment of the invention, there is a method of storing data of others on a computerized system having a processor. The method may include the step of storing, in a memory device, entity data for each of a plurality of accounts and in association therewith thereby forming stored entity data for each account, wherein each account is associated with an entity. The method may include certifying a portion of the stored entity data, thereby generating trusted entity data associated with each account. The method may also include the step of publishing a plurality of inconsistent sets of entity data for each of a plurality of accounts, wherein each inconsistent set of entity data includes trusted entity data that is consistent among publications but also includes user defined data that is inconsistent among publications. It may be that the trusted entity data is not personally identifying of the entity associated with its account.

The method of storing data of others on a computerized system having a processor may include the step of facilitating a plurality of transactions using trusted entity data, thereby generating transaction data associated with the plurality of accounts. The step of facilitating a plurality of transactions may include publishing user selected entity data that is not trusted and identifying trusted entity data as being trusted. The method may include storing, in a memory device, the transaction data in association with its associated accounts. The method may also include the step of encrypting, using a processor, the transaction data with a plurality of paired half-keys, one pair for each account wherein encryption process is performed by applying a paired half-key of a particular account to transaction data that is associated with that particular account, each paired half-key may include a first half-key that is common to the paired half keys of the plurality of accounts; and a second half-key that is unique among the half-keys of the plurality of accounts.

The method of storing data of others on a computerized system having a processor may include the step of storing the first half-key. The method may include the step of providing each entity with their associated second half-key. The method may include the step of deleting each second half-key such that the computerized system is no longer able to decrypt encrypted transaction data associated with a particular account without cooperation from the entity associated with that particular account. The method may include the step of encrypting personally identifying entity data of an account with its associated paired half-key. The method may also include the step of initiating a transaction using the first half-key and a second half-key to authenticate and verify account data.

The method of storing data of others on a computerized system having a processor may include the step of verifying biometric data associated with an account and associating a second half-key therewith. The method may include the step of storing a reputation score associated with an account and certifying the stored reputation score, thereby generating trusted reputation data.

According to one embodiment of the invention there is a system for storing data of others using a processor and a memory device. The system may include an account module that may be configured to manage a plurality of accounts, each account associated with an entity. The system may include a data storage module that may be in communication with the account module and may be configured to store data and storing entity data for each of the plurality of accounts and in association therewith thereby forming stored entity data for each account. The system may include a certification module that may be in communication with the data storage module and may be configured to certify a portion of the stored entity data, thereby generating trusted entity data associated with each account.

The system for storing data for others using a processor and a memory device may include an avatar module that may be in communication with each of the certification module and the data storage module and may be configured to permit entities to generate avatars for their accounts, wherein an avatar associates data with an account that is not required to be consistent with the account and not required to be consistent with data in other avatars of that same account. The system may include a publishing module that may be in communication with the avatar module and may be configured to publish a plurality of avatars and wherein each published avatar includes trusted entity data.

The system for storing data for others using a processor and a memory device may include a transaction module that may be in communication with the data storage module and may be configured to facilitate a plurality of transactions using trusted entity data, thereby generating transaction data associated with the plurality of accounts. The system may include an encryption module that may be in communication with the data storage module and may be configured to encrypt, using a processor, the transaction data with a plurality of paired half-keys, one pair for each account wherein encryption process is performed by applying a paired half-key of a particular account to transaction data that is associated with that particular account, each paired half-key may include a first half-key that may be common to the paired half keys of the plurality of accounts. Each paired half may include a second half-key that may be unique among the half-keys of the plurality of accounts. The encryption module may encrypt personally identifying entity data of an account with its associated paired half-key.

The system for storing data for others using a processor and a memory device may include a key management module that may be configured to store the first half-key, provide each entity with their associated second half-key, and delete each second half-key from the system such that the system is no longer able to decrypt encrypted transaction data associated with a particular account without cooperation from the entity associated with that particular account. The system may include an authentication module that may be in communication with the account module and may be configured to provide account authentication during transactions. The system may include a biometric identification module that may be in communication with the account module and may be configured to provide biometric verification of an entity associated with the account module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
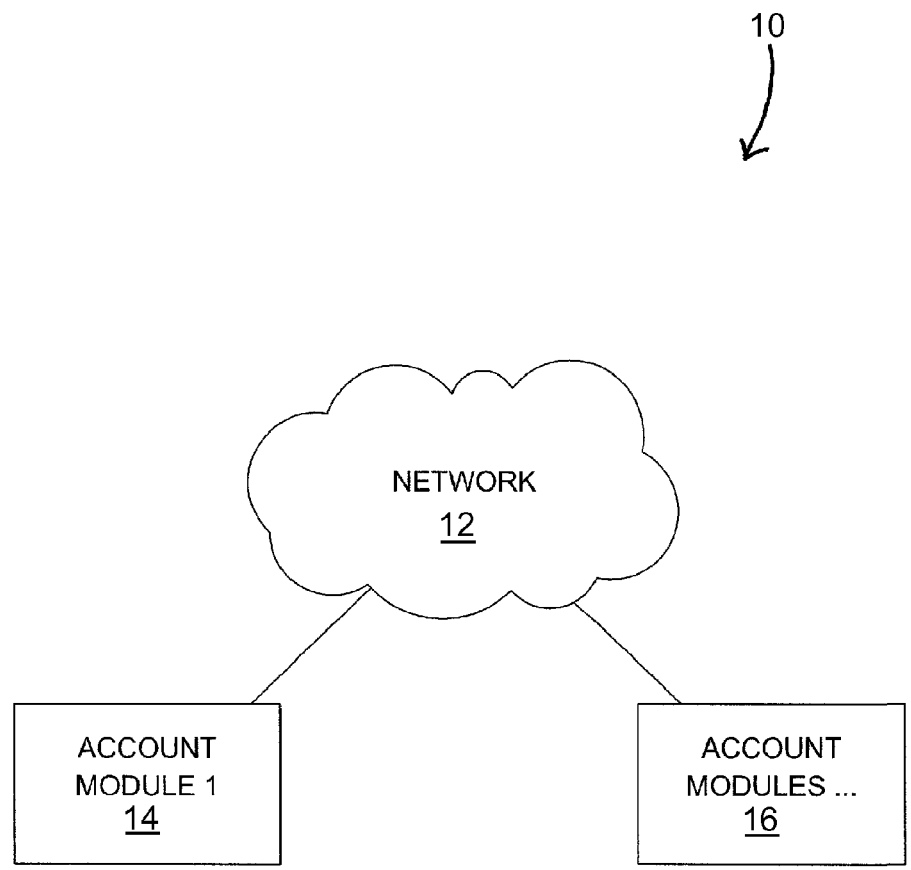
FIG. 1 is a network diagram of a system for storing data, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of programmable or executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. As those skilled in the art will appreciate, any computers discussed herein may include an operating system (e.g., Windows Vista, NT, 95/98/2000, OS2; UNIX; Linux; Solaris; MacOS; and etc.) as well as various conventional support software and drivers typically associated with computers. The computers may be in a home or business environment with access to a network. In an exemplary embodiment, access is through the Internet through a commercially-available web-browser software package.

The present invention may be described herein in terms of functional block components, screen shots, user interaction, optional selections, various processing steps, and the like. Each of such described herein may be one or more modules in exemplary embodiments of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, AJAX, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units and/or modules. Being "in communication" refers to any manner and/or way in which functional units and/or modules, such as, but not limited to, computers, laptop computers, PDAs, modules, and other types of hardware and/ or software, may be in communication with each other. Some non-limiting examples include communicating, sending, and/or receiving data and metadata via: a network, a wireless network, software, instructions, circuitry, phone lines, internet lines, satellite signals, electric signals, commands, web service calls, electrical and magnetic fields and/or pulses, and/or so forth.

As used herein, the term "network" may include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a network diagram of a system for storing data, according to one embodiment of the invention. There is shown an account module 14 of a system 10 in communication with other account modules 16 over a computerized network 12.

The illustrated account module 14 is a part of a social networking e-commerce system where real people can create virtual account modules that they can then be used to interact with the real and virtual world. An account module 14 can generally be owned and/or verified. An owned and verified account module 14 may be called a sovereign entity. A non-owned and non-verified account module may be called a ghost. An owned and non-verified account module 14 that will generally not ever be verified may be a club, business, collective, etc. Verifying/certifying an account module generally involves another sovereign entity affirming the validity of one or more biometric readings and/or identification token(s) (government id, etc.) associated with a real person that are then, through verification and authentication by the Creator sovereign entity, associated with the ghost account module and then the ghost account module is owned by that real person whose biometric data is from then on tied to the sovereign entity. Sovereign entities can choose to create and/or become a part of one or more owned and non-verified account modules.

An account module has account characteristics, such as but not limited to associated biometric data, inception date, creator, owner, and/or any demographic data associated with the owner. An account module may have one or more avatars, which are the "face" or "clothing" that the account module "wears" when it interacts with other account modules and entities. The avatar has avatar characteristics including but not limited to: name, appearance, demographic information, accumulated points, reputation, integrity, charisma, and etc, which may be calculated scores and or tracked and/or transferred among personas and/or avatars. Characteristics may be published, available only on request, or otherwise provided according to a particular predetermined protocol.

The illustrated account module 14 is configured to manage a plurality of accounts, each account associated with an entity. The account module 14 is in secure communication with a plurality of other account modules 16 of a system of storing data 10 over a computerized network 12. The account module 14 is configured to interact, communicate, transact, and transfer data with other account modules 16 over the computerized network; wherein the interaction, communication, transaction, and transfers may be done anonymously between the account modules; wherein account data is verified.

As a non-limiting example, there may be a person using an active fully anonymous avatar that may receive a request if the account associated with the avatar has a pacemaker and the avatar may provide that information only on request and/or may receive the information and act on it, such as but not limited to alerting the person through a device.

Avatars may inherit account characteristics. Accounts may inherit owner characteristics. Some avatar characteristics are limited, required to be consistent with associated account characteristics, or otherwise forced to be particular values or otherwise consistent across multiple and/or all avatars, such as but not limited to accumulated points, and/or integrity/reputation. Some avatar characteristics may be completely changeable and/or user configurable, such as but not limited to name, associated images, and etc.

Some avatar characteristics may be required to be verified by other sovereign entities and/or inherited from other entities, such as but not limited to recommendations, accreditations, and etc. Some avatar characteristics may be partially configurable and/or configurable only within predetermined and/or calculated ranges. Some avatar characteristics may be marked as private and/or null or otherwise not shown or available through a particular avatar. Interaction with other account/avatars may be automated and/or regulated according to account and/or avatar characteristics, such as not interacting with any avatar/account having an integrity rating below a particular threshold. There may be avatar templates that may be forced in one or more modes of configuration, such as but not limited to general avatar, public avatar, professional avatar, and etc.

Privacy is preserved by permitting sovereign entities to interact through avatars where determined characteristics are shown only as desired but because interaction critical characteristics (system unique identity, transaction information, etc.) are consistent and may be trusted, therefore the interactions may also be trusted. Other characteristics, such as real name, address, contact information, and etc. may be concealed or otherwise not associated with the transaction/interaction. Data may be stored in association with an account and/or avatar and may be encrypted according to keys that may be associated with biometric data of the owner and/or other encryption techniques.

An account may have a half (or other fraction) key so that multiple accounts may combine their keys to co-encrypt information that may be stored in association with a particular account. As a non-limiting example, medical information may be co-encrypted so that only when the doctor and patient both consent and present their half-keys would particular data associated with a patient be accessible. Points may be transacted between accounts and/or avatars without revealing non-critical characteristics. There is a dispute resolution system wherein accounts/avatars submit a dispute for resolution, pledge points to the solving thereof, provide evidence and argument in favor of their side and then non-involved parties may resolve the dispute and collect the pledged points while having access only to trusted characteristics that are associated with critical characteristics through the system. One part of this may include an editor who earns points by scrubbing identifying information from the evidence and arguments.

Applications (business software, games, social networks, smartphone applications, and etc.) may be built on this platform and may interact therewith. The system may coordinate virtual and real-world interactions between entities/accounts/avatars through devices such as but not limited to smartphones, RFID systems, home automation systems, inventory tracking systems, GPS devices, proximity sensors, and the like and combinations thereof. As a non-limiting example, a person may have an avatar that automatically activates in their smartphone when they are in a particular location as determined by the GPS of their smartphone. The automatically activated avatar may be a "consumer avatar" used for shopping. The avatar may, through a network contact or be contacted by a particular avatar of a retail store where the customer may be located at a particular moment and the two avatars may observe, judge, and/or automatically perform actions/interactions because of such.

In one non-limiting example, there may be quasi-biometric and/or non-biometric validation/verification instead of full biometric validation/verification such as but not limited to embedded RFID chips, tattooed bar codes, remembered passcodes, electronic dongles, and the like and combinations thereof.

In one non-limiting example, there may be sub-avatars that inherit characteristics, settings, features, relationships, and the like and combinations thereof from other avatars.

The sovereign entity may be configured to store personal data and may be used to verify an entity. The sovereign entity may include a biometric identification module, an authentication module, a private encryption module, a paired encryption module, and a legal identity module. The biometric identification module may be configured to verify an entity with biometric data. The biometric identification module may include a fingerprint scan, an eye scan, signature recognition, username and pass code, a blood sample, voice recognition, speech recognition, facial recognition, expression recognition, or any other type of biometric identifier to verify an entity and/or combinations thereof, such as but not limited to a series of such. The authentication module may be configured to authenticate an entity for use on the system. The authentication module may be in communication with the biometric identification module and may be configured to verify the biometric data to verify the entity. The legal identity module may be in communication with the authentication module and may be configured to store legal identity data regarding the sovereign entity. The legal identity module may be configured to match with the biometric identification module to verify the entity. The sovereign entity may include a private encryption module that may be configured to provide private encryption capabilities to the entity during transactions or use throughout the system. The private encryption module may include a plurality of levels of encryption, designed and selected by the entity. The sovereign entity may also include a paired encryption module configured to provide half of an encryption set to work in collaboration with another paired encryption module to access data that includes a paired encryption key. Access to the data is not available without both sets of encryption keys.

The account module may be configured to provide an account to a sovereign entity. The account module may include an avatar module, a relationship module, a characteristics module, a reputation module, an exchange module, a data storage module, an authentication module, a governance module, and an ownership module. The avatar module may be configured to provide various control settings and preferences for individual avatars for an account. The avatar module may include an anonymous module, a type module, a creation module, a native identity module. The anonymous module may be configured to provide an anonymous avatar to an entity while navigating through the system or network. The anonymous avatar does not contain any account information that may link the avatar to the entity. The creation module may be configured to provide operational controls to the entity to create a new avatar. Each avatar may be created, designed, and specified by the entity to perform certain functions or act in a particular way during an event, interaction, or relationship. The type module may be configured to provide a type of avatar that an entity may choose from, the type module may include a professional type, a personal type, a recreation module, etc. The native identity module may be configured to store identity data regarding the avatar created and the entity associated therewith.

The account module may include a characteristics module configured to store and set preferences for the account module during interactions, relationships, or use throughout a network or system. The characteristics module may include a demographic module. The demographic module may track, control, evaluate, store data about, alter, provide access to, update, and/or otherwise be involved in data regarding demographic characteristics of an account (age, real name, sex, address, race, etc.). A calculated stat module may track, control, evaluate, store data about, alter, provide access to, update, and/or otherwise be involved in data regarding information about an account that may be calculated or otherwise determined by algorithm (score, usage, number of relationships, transactions per hour, positive endorsements per transaction, etc.). A interaction characteristic module may track, control, evaluate, store data about, alter, provide access to, update, and/or otherwise be involved in data regarding characteristics of an account that may be influenced by the actions of others (reputation, charisma rating, frame, etc.). A privacy settings module may track, control, evaluate, store data about, alter, provide access to, update, and/or otherwise be involved in data regarding privacy settings associated with characteristics of an account (publish, access on request only, never publish, access per avatar, access per type of avatar, etc.). A validated characteristics module may track, control, evaluate, store data about, alter, provide access to, update, and/or otherwise be involved in data regarding characteristics of an account that may be, have been, or might be validated according to one or more validation protocols (real name, Soc. Sec. number, biometric data, real address, accreditations, work history, etc.).

The account module may include a relationship module configured to track and manage relationships between the account and other entities, companies, etc. The relationship module may include an association module, the association module may track, control, evaluate, store data about, alter, provide access to, update, and/or otherwise be involved in data regarding relationships of an account/avatar with other accounts/avatars (transactions/histories, relationship types, relationship qualities, contact information, public/private keys, relationship statuses, blocked relationships, relationship metadata, etc.). An avatar bridge module may track, control, evaluate, store data about, alter, provide access to, update, and/or otherwise be involved in data and/or interactions regarding particular avatars and the account such that the avatars may be controlled/regulated/consistent with the account.

The account module may include a data storage module that may be configured to store data regarding the interactions and relationships associated with the account module and the avatars associated therewith. The authentication module may be configured to verify the entity requesting the access to the account module or the avatars associated therewith. The ownership module may be configured to provide ownership data to the various avatars associated with the account module.

The account module may include a reputation module that may be configured to provide a reputation score or evaluation of the reputation associated with the account module. The reputation module may include a scoring module configured to provide a scoring algorithm configured to generate a reputation score. The algorithm may be based upon the number of transactions by the account divided by the number of complaints times by the reputation percentage score of the complainant. The reputation module may include a time module configured to keep track of the time logs of the scoring, complaints, etc. The reputation module may include a modification module configured to provide modifiers to the reputation score. The modifiers may include an increase or decrease to the reputation score. An example may be a company modifier, wherein the reputation score may be modified depending on the reputation score of a company owned by the entity. The overall calculation module is in communication with the scoring module, time module, and the modification module and is configured to provide an up to date reputation score calculation based upon the reputation score, company score, and the time period of the scores. The reputation module may include a legal adjustment module configured to provide adjustments based upon legally enforced judgments on the entity.

There may be a network in communication with a dispensary, a doctor's office, and a sovereign entity. The sovereign entity may be configured to be controlled by a real person. The sovereign entity may be configured to be verified by either a dispensary or a doctor's office. The sovereign entity may also be verified by an trusted entity.

Figure 2:
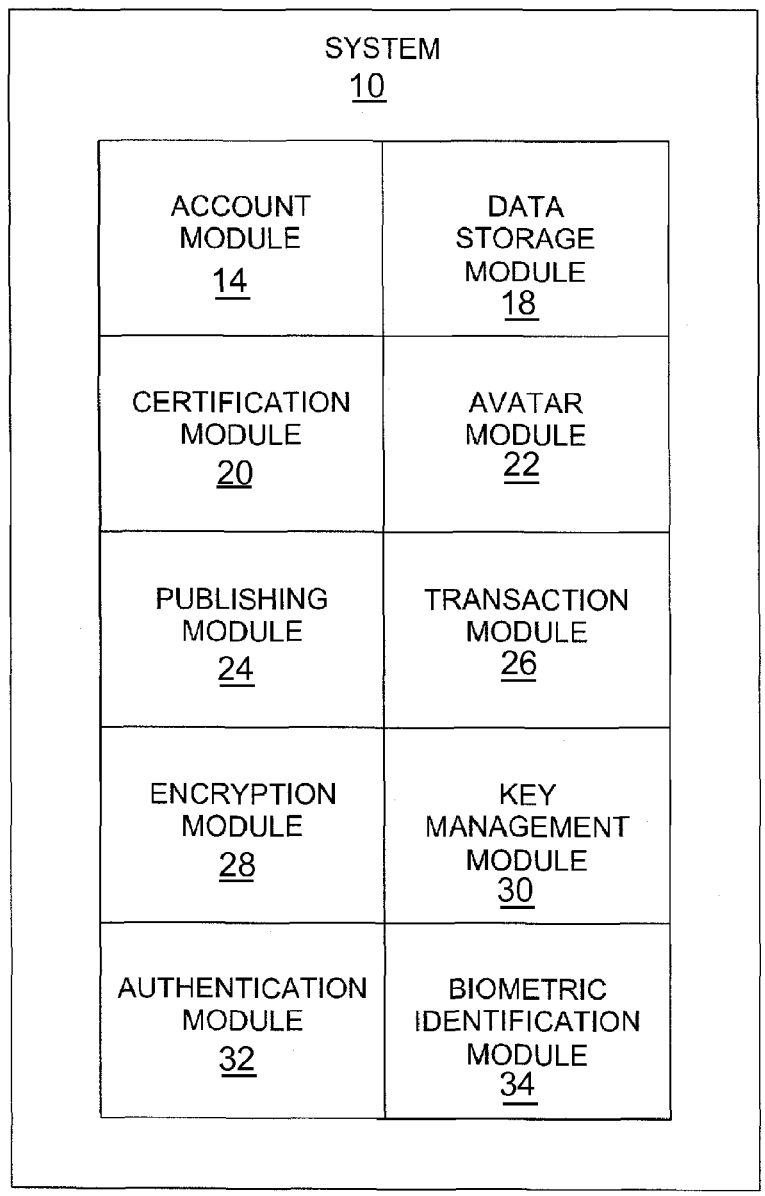
FIG. 2 is a system module diagram, according to one embodiment of the invention.

FIG. 2 is a module diagram of a system for storing data of others, according to one embodiment of the invention. There is shown a system 10 including an account module 14, a data storage module 18, a certification module 20, an avatar module 22, a publishing module 24, a transaction module 26, an encryption module 28, a key management module 30, an authentication module 32, and a biometric identification module 34. Each illustrated module is in communication with other modules described herein to the degree needed and/or appropriate for performing the function(s) described herein that apply to the associated module. Such communication may be over a network, by shared memory addresses, passed variable, shared variables, over a bus, and the like and combinations thereof.

The illustrated system 10 is for storing data of others using a processor and a memory device. The system 10 includes an account module 14 configured to manage a plurality of accounts, each account associated with an entity. The account module 14 is configured to manage and control the characteristics and aspects of each account. The account module 14 is configured to ensure verification of account users while interacting, communicating, transacting, and transferring data with other account modules over a computerized network. Non-limiting examples of an account module may be an identity module as described in U.S. Patent Publication No.: 2012/0246481; or a trusted platform module as described in U.S. Pat. No. 8,296,841, which references are incorporated for their supporting teachings herein.

The system 10 includes a data storage module 18 in communication with the account module 14 and configured to store data and storing entity data for each of the plurality of accounts and in association therewith thereby forming stored entity data for each account. The data storage module 18 is in communication with the various modules and components of the system 10. The data storage module 18 is configured to store data transferred through each of the account modules 14 and the system 10. The data storage module is configured to securely store user account data along with data transferred therethrough. Data storage modules may be databases or data files and the memory storage device may be hard drives or tapes. A non-limiting example of a data base is Filemaker Pro 11, manufactured by Filemaker Inc., 5261 Patrick Henry Dr., Santa Clara, Calif., 95054. Non-limiting examples of a storage module may include: a HP Storage Works P2000 G3 Modular Smart Array System, manufactured by Hewlett-Packard Company, 3000 Hanover Street, Palo Alto, Calif., 94304, USA; or a Sony Pocket Bit USB Flash Drive, manufactured by Sony Corporation of America, 550 Madison Avenue, New York, N.Y., 10022.

The system 10 includes a certification module 20 in communication with the data storage module 18 and configured to certify a portion of the stored entity data, thereby generating trusted entity data associated with each account. The trusted entity data is not personally identifying of the entity associated with its account. The trusted entity data is configured to verify the entity anonymously without having to show personal private data. The certification module 20 is configured to provide secure certification of the stored entity data, thereby entrusting that the account module 14 is certified to perform interactions, communications, transactions, and transfers of data over a computerized network. Non-limiting examples of a certification module may be a security module as described in U.S. Pat. No. 7,225,337; or a certification system as described in U.S. Pat. No. 7,519,825, which references are incorporated for their supporting teachings herein.

The system 10 for storing data for others using a processor and a memory device includes an avatar module 22 in communication with each of the certification module 20 and the data storage module 18. The avatar module 22 is configured to permit entities to generate avatars for their accounts, wherein an avatar associates data with an account that is not required to be consistent with the account and not required to be consistent with data in other avatars of that same account. Non-limiting examples of an avatar module may be a system as described in U.S. Patent Publication No.: 2009/0300513; or an avatar as described in U.S. Patent Publication No.: 2009/0144639, which references are incorporated for their supporting teachings herein.

The system 10 includes a publishing module 24 in communication with the avatar module 22 and configured to publish a plurality of avatars and wherein each published avatar includes trusted entity data. The publishing module 24 is configured to publish data over a secure connection in a computerized network. Non-limiting examples of a publishing module may be a system as described in U.S. Patent Publication No.: 2012/0310884; or a publishing module as described in U.S. Patent Publication No.: 2008/0228507, which references are incorporated for their supporting teachings herein.

The system 10 for storing data for others using a processor and a memory device includes a transaction module 26 in communication with the data storage module 18 and configured to facilitate a plurality of transactions using trusted entity data, thereby generating transaction data associated with the plurality of accounts. The transaction module 26 is configured to track and manage a plurality of transaction associated with the trusted entity data and the account module 14. Non-limiting examples of a transaction module may be a transaction module as described in U.S. Patent Publication No.: 2012/0084211; or a system as described in U.S. Patent Publication No.: 2012/0246073, which references are incorporated for their supporting teachings herein.

The system 10 includes an encryption module 28 in communication with the data storage module 18 and configured to encrypt, using a processor, the transaction data with a plurality of paired half-keys, one pair for each account wherein the encryption process is performed by applying a paired half-key of a particular account to transaction data that is associated with that particular account. Each paired half-key includes a first half-key that is common to the paired half keys of the plurality of accounts. Each paired half includes a second half-key that is unique among the half-keys of the plurality of accounts. The encryption module 28 encrypts personally identifying entity data of an account with its associated paired half-key. Non-limiting examples of an encryption module may be an encryption system as described in U.S. Pat. No. 4,423,287; or a data security apparatus as described in U.S. Pat. No. 6,219,421, which references are incorporated for their supporting teachings herein.

The system 10 for storing data for others using a processor and a memory device includes a key management module 30 that is configured to store the first half-key, provide each entity with their associated second half-key, and delete each second half-key from the system 10 such that the system 10 is no longer able to decrypt encrypted transaction data associated with a particular account without cooperation from the entity associated with that particular account. Non-limiting examples of a key management module may be an encryption system as described in U.S. Pat. No. 8,284,945; or a management apparatus as described in U.S. Pat. No. 8,341,423, which references are incorporated for their supporting teachings herein.

The system 10 includes an authentication module 32 in communication with the account module 14 and configured to provide account authentication during transactions. The authentication module 32 is configured to provide authorization for transactions through the account module 14. The authentication module 32 is configured to authenticate transaction transfers or data transfer over a computerized network. Non-limiting examples of an authentication module may be an authentication module as described in U.S. Pat. No. 7,971,243; or an authentication module as described in U.S. Patent Publication No.: 2003/0070069, which references are incorporated for their supporting teachings herein.

The system 10 includes a biometric identification module 34 in communication with the account module 14 and configured to provide biometric verification of an entity associated with the account module 14. The biometric identification module 34 is configured to identify and manage biometric data associated with the trusted entity. Non-limiting examples of a biometric identification module may be one or more verification modules as described in U.S. Pat. No. 7,194,632; or a system as described in U.S. Patent Publication No. 2012/0250948, which references are incorporated for their supporting teachings herein.

Figure 3:
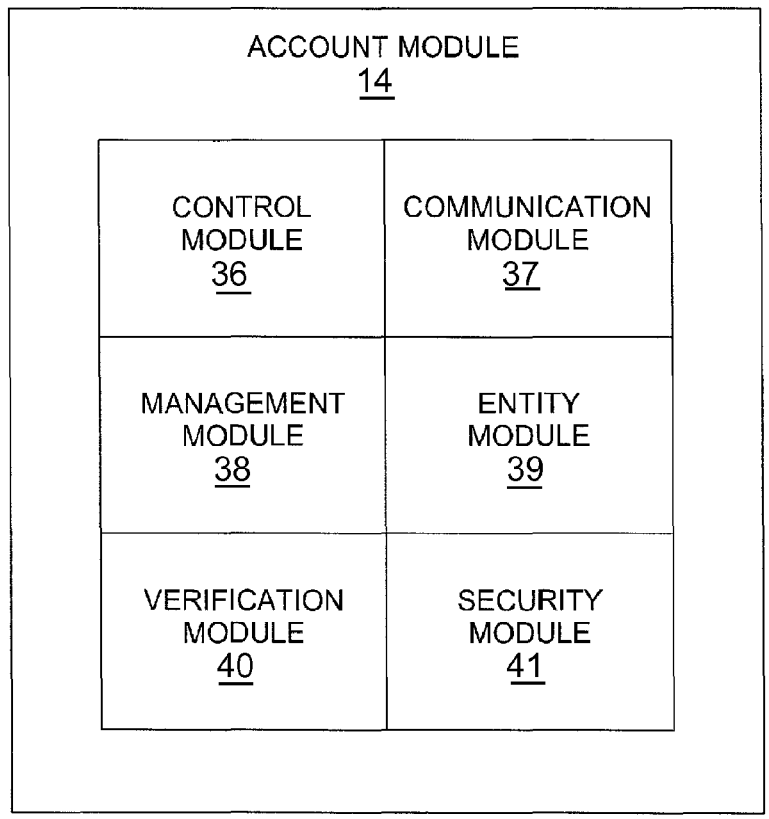
FIG. 3 is a module diagram of an account module, according to one embodiment of the invention.

FIG. 3 is a module diagram of an account module, according to one embodiment of the invention. There is shown an account module 14 including a control module 36, a communication module 37, a management module 38, an entity module 39, a verification module 40, and a security module 41. Each illustrated module is in communication with other modules described herein to the degree needed and/or appropriate for performing the function(s) described herein that apply to the associated module. Such communication may be over a network, by shared memory addresses, passed variable, shared variables, over a bus, and the like and combinations thereof.

The illustrated account module 14 is configured to manage a plurality of accounts, each account associated with an entity. The account module 14 is configured to manage and control the characteristics and aspects of each account. The account module 14 is configured to ensure verification of account users while interacting, communicating, transacting, and transferring data with other account modules over a computerized network.

The account module 14 is configured to store personal and/or business characteristics (Soc. Sec. number, address, name, age, birthdate, EIN number, etc.), account information for accounts linked to the same (bank accounts, insurance accounts, social median accounts, credit accounts, credit card accounts, cloud service accounts, etc.), preferences, and the like and combinations thereof. The account module is configured to provide account information when authorized and when requested by the funding system. Non-limiting examples of an account module may be a user account system as described in U.S. Patent Publication No.: 2008/0130524 by Volach et al.; or a user account system as described in U.S. Patent Publication No.: 2009/0210928 by Ourega, which references are incorporated for their supporting teachings herein.

The account module 14 includes a control module 36 configured to provide operational controls and instructions to the modules and components of the account module. The control module is in communication with the modules and components of the account module and is configured to provide operational instructions and commands thereto. Non-limiting examples of a control module may be a control module described in U.S. Pat. No. 5,430,836, issued to Wolf et al.; or a control module described in U.S. Pat. No. 6,243,635, issued to Swan et al. which references are incorporated for their supporting teachings herein. A control module may include but is not limited to a processor, a state machine, a script, a decision tree, and the like.

The account module 14 includes a communication module 37, such as a wireless communication module, and configured to communicate with a computerized network. The communication module 37 is configured to provide communication capabilities, such as wireless communication, to the modules and components of the account module and the components and modules disposed therein. The wireless communication module may be configured to provide communication between a wireless device, such as a cell phone, and a computerized network. Non-limiting examples of a wireless communication module may be but not limited to: a communication module described in U.S. Pat. No. 5,307,463, issued to Hyatt et al.; or a communication module described in U.S. Pat. No. 6,133,886, issued to Fariello et al., which are incorporated for their supported herein.

The illustrated account module 14 includes a management module 38 configured to provide management and administration capabilities to the account module and the accounts associated therewith. The management module is configured to manage a plurality of accounts and the characteristics associated therewith, wherein the management module is configured to provide operational instructions and management capabilities to the modules and components of the account module. Non-limiting examples of a management module may be a management system as described in U.S. Patent No Publication No.: 2010/0042503 by Farmer; or a management module as described in U.S. Patent Publication No.: 2011/0251888 by Faith et al., which references are incorporated for their supporting teachings herein.

The account module 14 includes an entity module 39 configured to authenticate and privately store entity data associated with the account module 14. The entity module 39 is configured to authenticate and verify account data using the trusted entity data stored in the entity module. Non-limiting examples of an entity module may be a virtual data storage entity as described in U.S. Patent Publication No.: 2012/0221820; or a system as described in U.S. Pat. No. 8,250,184, which references are incorporated for their supporting teachings herein.

The illustrated account module 14 includes a verification module 40 configured to verify account data entered into the account module 14. The verification module 40 is configured to verify data associated with the account module 14 and the plurality of accounts associated therewith. Non-limiting examples of a verification module may be a verification module as described in U.S. Pat. No. 6,853,973, issued to Mathews et al.; or a computer program as described in U.S. Pat. No. 7,051,343, issued to Bracha et al., which references are incorporated for their supporting teachings herein.

The illustrated account module 14 includes a security module 41 is configured to provide security parameters thereto. The security module 41 is configured to provide secure communication and transfer capabilities to the account module 14 over a computerized network. The security module 41 is in communication with the management module 38 and the control module 36, wherein the management module manages and monitors the security module 41. The security module is configured to notify a third party, authorized personnel, or the police after a theft or unauthorized access or transfer of data. Non-limiting examples of a security module may be a wireless security module as described in U.S. Pat. No. 7,350,230 issued to Forrest; or a security module as described in U.S. Patent Publication No.: 2006/0072762 by Buer, which are incorporated for their supported teachings herein.

Figure 4:
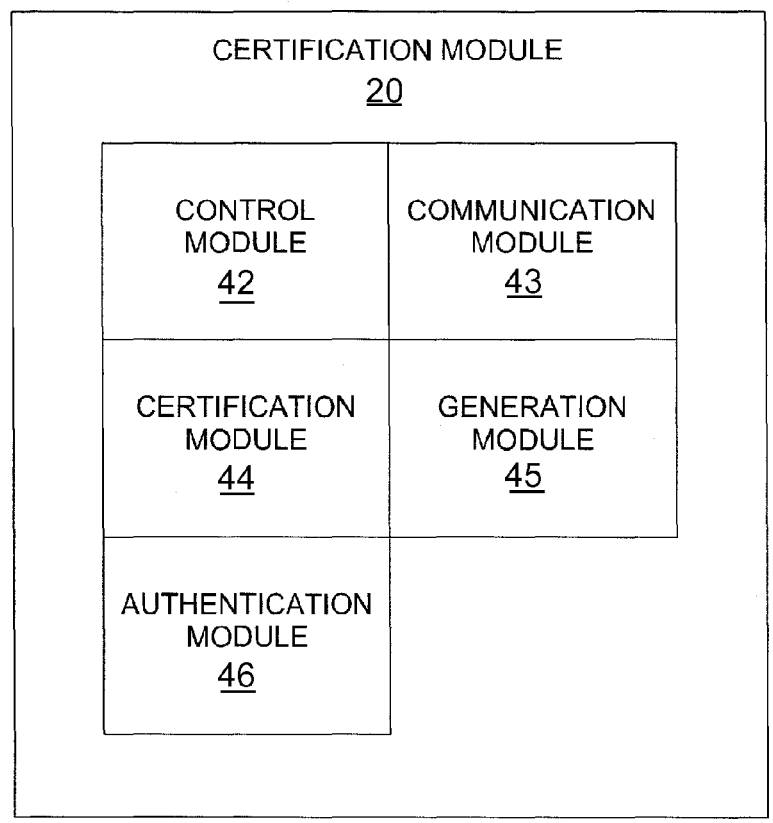
FIG. 4 is a module diagram of a certification module, according to one embodiment of the invention.

FIG. 4 is a module diagram of a certification module, according to one embodiment of the invention. There is shown a certification module 20 including a control module 42, a communication module 43, a certification module 44, a generation module 45, and an authentication module 46. Each illustrated module is in communication with other modules described herein to the degree needed and/or appropriate for performing the function(s) described herein that apply to the associated module. Such communication may be over a network, by shared memory addresses, passed variable, shared variables, over a bus, and the like and combinations thereof.

The illustrated certification module 20 is configured to certify a portion of the stored entity data, thereby generating trusted entity data associated with each account. The trusted entity data is not personally identifying of the entity associated with its account. The trusted entity data is configured to verify the entity anonymously without having to show personal private data. The certification module 20 is configured to provide secure certification of the stored entity data, thereby entrusting that the account module is certified to perform interactions, communications, transactions, and transfers of data over a computerized network.

The certification module 20 includes a control module 42 configured to provide operational controls and instructions to the modules and components of the certification module 20. The control module is in communication with the modules and components of the certification module 20 and is configured to provide operational instructions and commands thereto. The certification module 20 includes a communication module 43, such as a wireless communication module, and configured to communicate with a computerized network. The communication module 43 is configured to provide communication capabilities, such as wireless communication, to the modules and components of the certification module. The wireless communication module may be configured to provide communication between a wireless device, such as a cell phone, and a computerized network.

The illustrated certification module 20 includes a secure certification module 44 configured to provide certification of data transferred therethrough. The secure certification module 44 is configured to certify secure data transferred through the modules and components thereof. The certification module 20 is configured to certify stored entity data for each account for each account module of the system. The certification module 20 is configured to provide certified data associated with an account module or an account of an account module. Non-limiting examples of a certification module may be a security module as described in U.S. Pat. No. 7,225,337; or a certification system as described in U.S. Pat. No. 7,519,825, which references are incorporated for their supporting teachings herein.

The certification module 20 includes a generation module 45 in communication with the certification module 44, and configured to generate a certificate with the certified data. The certificate typically verifies stored entity data associated with an account and with an account module. The generation module may be a system as described in U.S. Patent Publication No.: 2005/0138386; or a certification system as described in U.S. Pat. No. 6,233,341, which references are incorporated for their supporting teachings herein.

The certification module 20 includes an authentication module 46 in communication with the certification module 44 and the generation module 45, configured to authenticate data transferred therethrough. The authentication module 46 is configured to authenticate stored entity data along with certification data and generation data before completion of the certificate of trusted entity data. Non-limiting examples of an authentication module may be an authentication module as described in U.S. Patent Publication No.: 2003/0070069; or an authentication platform as described in U.S. Pat. No. 7,930,264, which references are incorporated for their supporting teachings herein.

Figure 5:
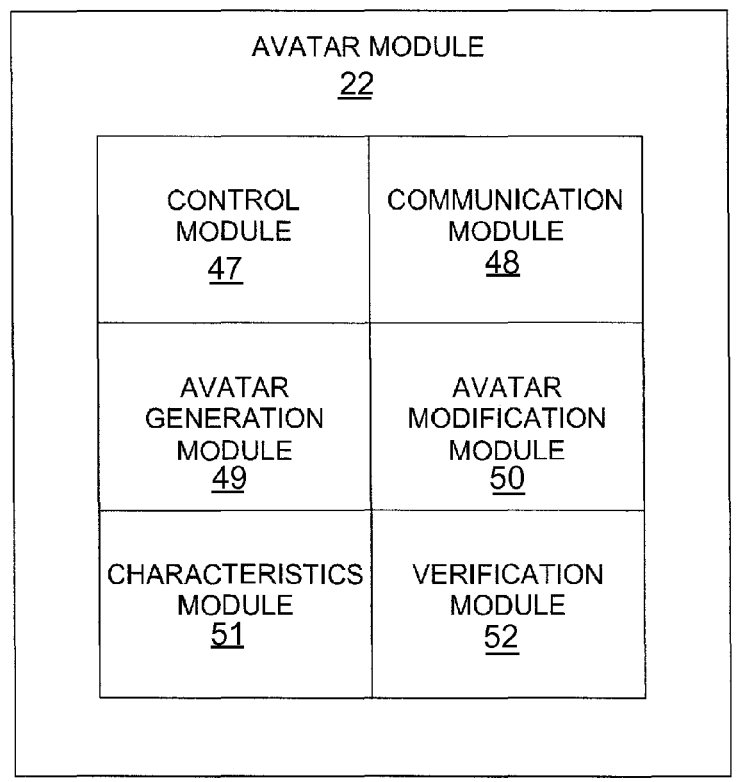
FIG. 5 is a module diagram of an avatar module, according to one embodiment of the invention.

FIG. 5 is a module diagram of an avatar module, according to one embodiment of the invention. There is shown an avatar module 22 including a control module 47, a communication module 48, an avatar generation module 49, an avatar modification module 50, a characteristics module 51, and a verification module 52. Each illustrated module is in communication with other modules described herein to the degree needed and/or appropriate for performing the function(s) described herein that apply to the associated module. Such communication may be over a network, by shared memory addresses, passed variable, shared variables, over a bus, and the like and combinations thereof.

The illustrated avatar module 22 may be a system for managing personal and/or business account information such as but not limited to personal and/or business characteristics (Soc. Sec. number, address, name, age, birthdate, EIN number, etc.), account information for accounts linked to the same (bank accounts, insurance accounts, social median accounts, credit accounts, credit card accounts, cloud service accounts, etc.), preferences, and the like and combinations thereof. Such may include one or more databases, security/encryption systems, communication tools, and the like and combinations thereof. Non-limiting examples of the same include smartphone operating systems, voice recognition systems with software applications integration (Siri, Google Assistant, etc.), calendar tools, contact list software, social media systems (Facebook, Google+, LinkedIn, etc.), password banks, virtual personal assistants, and the like and combinations thereof.

The avatar module 22 includes a control module 47 configured to provide operational controls and instructions to the modules and components thereof. The control module 47 is in communication with the modules and components of the avatar module and is configured to provide operational instructions and commands thereto. The avatar module 22 includes a communication module 48, such as a wireless communication module and configured to communicate with a computerized network. The communication module 48 is configured to provide communication capabilities, such as wireless communication, to the modules and components of the avatar module. The wireless communication module may be configured to provide communication between a wireless device, such as a cell phone, and a computerized network.

The avatar module 22 includes a verification module 52 configured to provide verification and security capabilities to the avatar module 22. The verification module 52 is in communication with the avatar module and configured to enable access thereto. The verification module 52 is configured to provide secure communication with various modules and components of the system over a computerized network. The verification module 52 is configured to verify and authenticate data transferred through the avatar module 52. The verification module 52 is also configured to provide security settings to the modules and components of the avatar module 22. Non-limiting examples of a verification module may be a wireless security module as described in U.S. Pat. No. 7,350,230 issued to Forrest; or a security module as described in U.S. Patent Publication No.: 2006/0072762 by Buer, which are incorporated for their supported teachings herein.

The verification module 52 is also configured to authorize access transactions and transfers associated with the avatar module and the associated account modules and accounts. The verification module is configured to verify data from a user attempting to access an avatar module or to authorize a transaction or transfer associated with the avatar module or an account module. Non-limiting examples of an verification module may be an authorization module as described in U.S. Pat. No. 7,853,993, issued to Vayman; or an authorization module as described in U.S. Pat. No. 7,753,265, issued to Harris, which references are incorporated for their supporting teachings herein.

The avatar module 22 includes a characteristics module 51 configured to track and manage the various characteristics of each avatar module 22 for each account and for each account module. The characteristics module 51 is configured to manage data being displayed or transferred over a computerized network while using an account module or an avatar module to interact with other accounts, avatars, and account modules. The characteristics may be data, preferences, settings, custom settings, languages, etc. Non-limiting examples of a characteristics module may be a system as described in U.S. Patent Publication No.: 2009/02548459; or a system as described in U.S. Pat. No. 6,397,080, which references are incorporated for their supporting teachings herein.

The avatar module 22 includes an avatar generation module 49 configured to generate an avatar based upon characteristics selected by the characteristics module 51. The avatar generation module 49 is configured to generate an avatar that may or may not resemble the user. The avatar generation module 49 is configured to generate an avatar based upon selections made by the user or data associated with an account module or an account. Non-limiting examples of an avatar generation module may be a system as described in U.S. Patent Publication No.: 2012/0309520; or a system as described in U.S. Patent Publication No.: 2009/0300513, which references are incorporated for their supporting teachings herein. The avatar module 22 includes an avatar modification module 50 configured to modify settings, characteristics, parameters, or displayed data of generated avatars.

Figure 6:
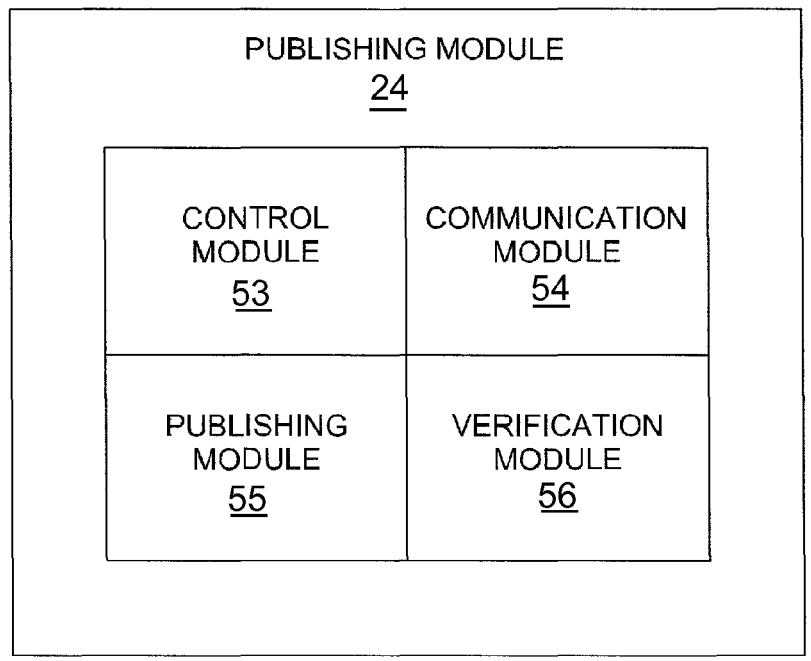
FIG. 6 is a module diagram of a publishing module, according to one embodiment of the invention.

FIG. 6 is a module diagram of a publishing module, according to one embodiment of the invention. There is shown a publishing module 24 including a control module 53, a communication module 54, a publishing module 55, and a verification module 56. Each illustrated module is in communication with other modules described herein to the degree needed and/or appropriate for performing the function(s) described herein that apply to the associated module. Such communication may be over a network, by shared memory addresses, passed variable, shared variables, over a bus, and the like and combinations thereof.

The illustrated publishing module 24 is configured to publish a plurality of avatars and wherein each published avatar includes trusted entity data. The publishing module 24 is configured to publish data over a secure connection in a computerized network.

The publishing module 24 includes a control module 53 configured to provide operational controls and instructions to the modules and components of the publishing module. The publishing module 24 also includes a communication module 54 configured to communicate with a computerized network. The communication module 54 is configured to provide communication capabilities, such as wireless communication, to the modules and components of the publishing module and the components and modules disposed therein.

The publishing module 24 includes a publishing module 55 configured to publish data over a computerized network. The publishing module 55 is configured to format and manipulate data to be published over a computerized network. The publishing module 55 is configured to publish data designated by the account module, accounts, and avatars. The publishing module 55 is configured to publish a plurality of avatars and the trusted entity data associated therewith. The publishing module 24 is configured to publish data over a secure connection in a computerized network.

The publishing module 24 includes a verification module 56 in communication with the publishing module 55 and configured to verify and track data published through the publishing module 24. Non-limiting examples of a verification module may be a verification module as described in U.S. Pat. No. 6,853,973; or a verification module as described in U.S. Pat. No. 8,296,477, which references are incorporated for their supporting teachings herein.

Figure 7:
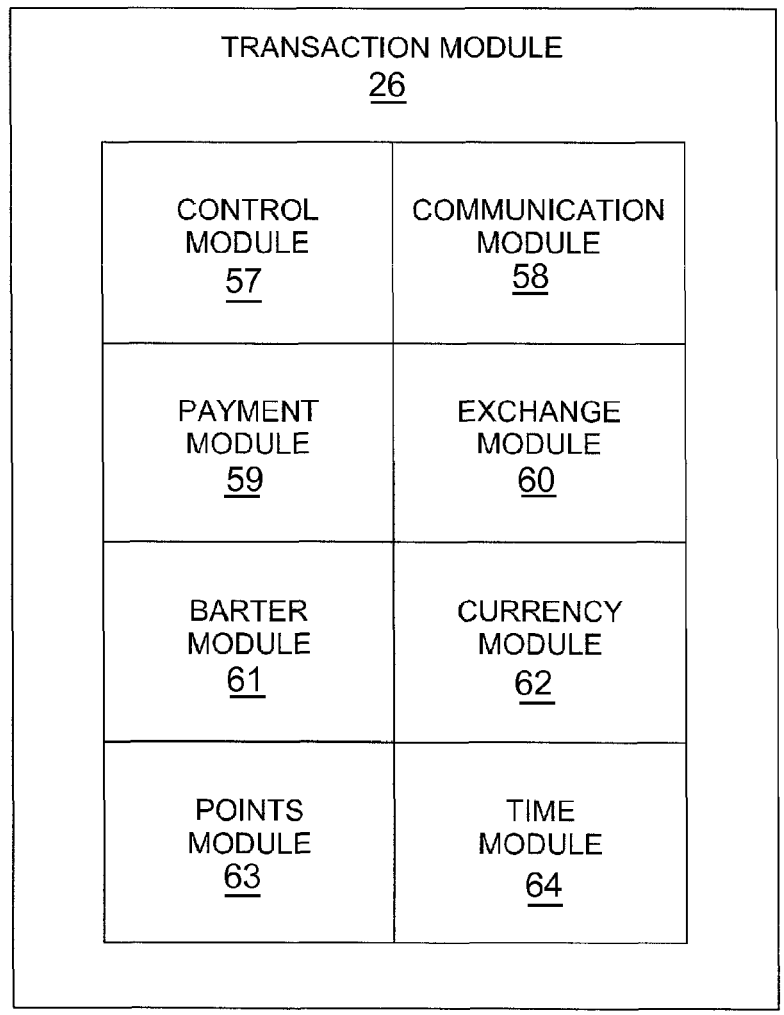
FIG. 7 is a module diagram of a transaction module, according to one embodiment of the invention.

FIG. 7 is a module diagram of a transaction module, according to one embodiment of the invention. There is shown a transaction module 26 including a control module 57, a communication module 58, a payment module 59, an exchange module 60, a barter module 61, a currency module 62, a points module 6, and a time module 64. Each illustrated module is in communication with other modules described herein to the degree needed and/or appropriate for performing the function(s) described herein that apply to the associated module. Such communication may be over a network, by shared memory addresses, passed variable, shared variables, over a bus, and the like and combinations thereof.

The illustrated transaction module 26 is configured to facilitate a plurality of transactions using trusted entity data, thereby generating transaction data associated with the plurality of accounts. The transaction module 26 is configured to track and manage a plurality of transaction associated with the trusted entity data and the account module.

The transaction module 26 includes a control module 57 configured to provide operational controls and instructions to the modules and components of the publishing module. The control module 57 is configured to track, control, evaluate, manage, store data about, route traffic to/from, coordinate between, and/or otherwise be involved in transactions involving one or more modules of the transaction module 26. The transaction module 26 also includes a communication module 58 configured to communicate with a computerized network. The communication module 58 is configured to provide communication capabilities, such as wireless communication, to the modules and components of the publishing module and the components and modules disposed therein.

The illustrated transaction module 26 includes a payment module 59 configured to provide payment receiving capabilities and exchange currency/money for other good/services to be purchased over a computerized network. The payment module 59 is configured to provide payment capabilities to the transaction module 26. The payment module 59 is configured to track and manage payments processed therethrough. The payment module 59 is configured to provide payment capabilities from the account module to other account modules, accounts, avatars, businesses, vendors, third-parties, etc. Non-limiting examples of a payment module may include a HP POS system Rp5700, manufactured by Hewlett Packard Company, 3000 Hanover Street, Palo Alto, Calif., 94304; or a pcAmerica Retail POS system, manufactured by pcAmerica, One Blue Hill Plaza 2nd Floor, PO Box 1546, Pearl River, N.Y., 10965; or a POSMicro Premier Retail POS PMSM-2-BO, manufactured by POSMicro, 1225 E. Sunset Dr. Step 145 #356, Bellingham, Wash., 98226.

The illustrated transaction module 26 includes an exchange module 60 configured to provide payment or exchange currency for the transactions and activities associated with the account. The exchange module is configured to track, control, evaluate, store data about, and/or otherwise be involved in information transactions (articles, posts, evaluations, raw data, processed data, data processing, etc.). The transaction module 26 includes a barter module 61. The barter module 61 is configured to track, control, evaluate, store data about, and/or otherwise be involved in barter transactions. The transaction module 26 includes a points module 63 configured to track, control, evaluate, store data about, and/or otherwise be involved in point transactions, wherein points may be any collection of virtual objects that may be counted and/or transferred.

The illustrated transaction module 26 includes a currency module 62 configured to track, control, evaluate, store data about, and/or otherwise be involved in currency transactions, namely transactions in objects, virtual or otherwise, that have official monetary value according to a respected authority and/or government. The transaction module 26 includes a time module 64 configured to track, control, evaluate, store data about, and/or otherwise be involved in time transactions, such as those provided by service providers (lawyers and other professionals who may provide services "by the hour", and etc.).

Figure 8:
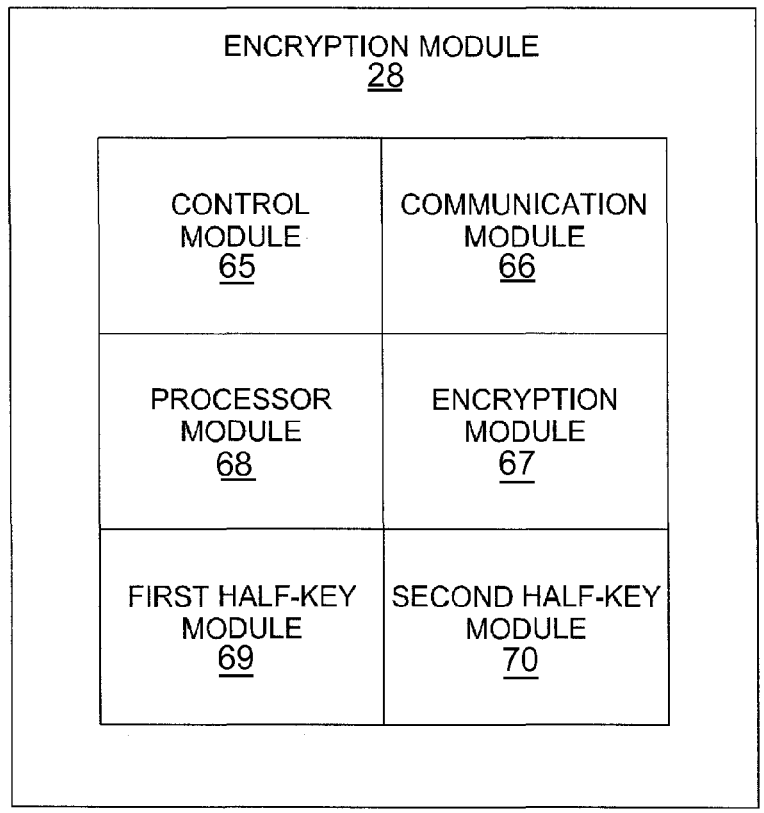
FIG. 8 is a module diagram of an encryption module, according to one embodiment of the invention.

FIG. 8 is a module diagram of an encryption module, according to one embodiment of the invention. There is shown an encryption module 28 including a control module 65, a communication module 66, a processor module 68, an encryption module 67, a first half-key module 69, and a second half-key module 70. Each illustrated module is in communication with other modules described herein to the degree needed and/or appropriate for performing the function(s) described herein that apply to the associated module. Such communication may be over a network, by shared memory addresses, passed variable, shared variables, over a bus, and the like and combinations thereof.

The illustrated encryption module 28 is configured to encrypt, using a processor module 68, the transaction data with a plurality of paired half-keys, one pair for each account wherein the encryption process is performed by applying a paired half-key of a particular account to transaction data that is associated with that particular account. Each paired half-key includes a first half-key that is common to the paired half keys of the plurality of accounts. Each paired half includes a second half-key that is unique among the half-keys of the plurality of accounts. The encryption module 28 encrypts personally identifying entity data of an account with its associated paired half-key.

The encryption module 28 includes a control module 65 configured to provide operational controls and instructions to the modules and components of the publishing module. The encryption module 28 also includes a communication module 66 configured to communicate with a computerized network. The communication module 66 is configured to provide communication capabilities, such as wireless communication, to the modules and components of the publishing module and the components and modules disposed therein.

The encryption module 28 includes a processor module 68 configured to process data transferred through the encryption module 28. The encryption module 28 includes an encryption module 67 configured to generate an encryption key to access, authorize use, authenticate, and verify data transfer therethrough. Non-limiting examples of an encryption module may be an encryption system as described in U.S. Pat. No. 4,423,287; or a data security apparatus as described in U.S. Pat. No. 6,219,421, which references are incorporated for their supporting teachings herein.

The encryption module 28 includes a first half-key module 69 and a second half-key module 70. The first half key module 69, in communication with the processor module 68, is configured to generate/store/assign a first half-key associated with a second half-key; wherein the second half-key module 70 is configured to generate/store/assign a second half-key. The pair of half-keys are configured to be for each account, wherein the encryption process is performed by applying a paired half-key of a particular account to transaction data that is associated with that particular account. Each paired half-key includes a first half-key that is common to the paired half keys of the plurality of accounts. Each paired half includes a second half-key that is unique among the half-keys of the plurality of accounts. Paired half-keys may be combined by appending one to the other, by masking one with the other, by encrypting one with the other, by performing a function on one using the other as a seed value and the like and combinations thereof.

Figure 9:
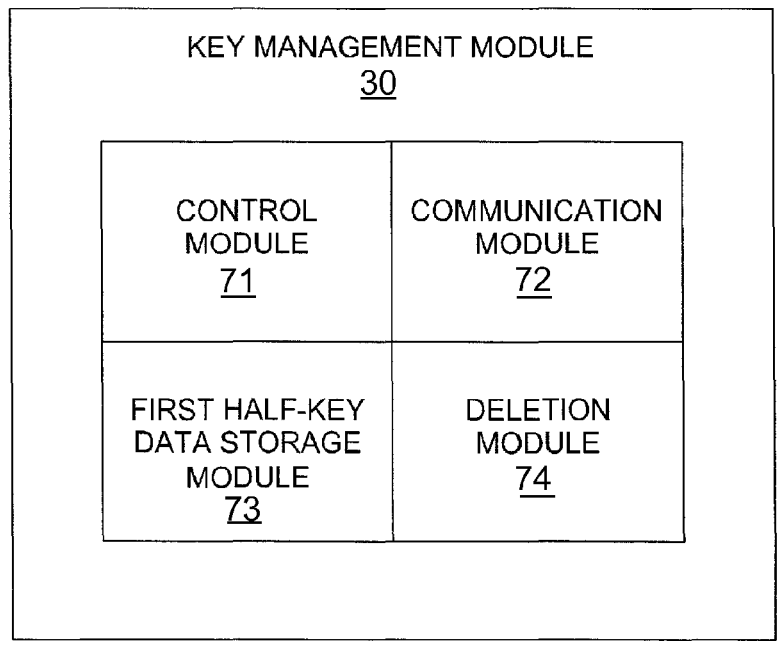
FIG. 9 is a module diagram of a key management module, according to one embodiment of the invention.

FIG. 9 is a module diagram of a key management module, according to one embodiment of the invention. There is shown a key management module 30 including a control module 71, a communication module 72, a first half-key data storage module 73, and a deletion module 74. Each illustrated module is in communication with other modules described herein to the degree needed and/or appropriate for performing the function(s) described herein that apply to the associated module. Such communication may be over a network, by shared memory addresses, passed variable, shared variables, over a bus, and the like and combinations thereof.

The illustrated key management module 30 that is configured to store the first half-key, provide each entity with their associated second half-key, and delete each second half-key from the system such that the system is no longer able to decrypt encrypted transaction data associated with a particular account without cooperation from the entity associated with that particular account.

The key management module 30 includes a control module 71 configured to provide operational controls and instructions to the modules and components of the publishing module. The key management module 30 also includes a communication module 72 configured to communicate with a computerized network. The communication module 72 is configured to provide communication capabilities, such as wireless communication, to the modules and components of the publishing module and the components and modules disposed therein.

The key management module 30 includes a first half-key data storage module configured to securely store the first half-key of the paired half key encryption. Data storage modules may be databases or data files and the memory storage device may be hard drives or tapes. A non-limiting example of a data base is Filemaker Pro 11, manufactured by Filemaker Inc., 5261 Patrick Henry Dr., Santa Clara, Calif., 95054. Non-limiting examples of a storage module may include: a HP Storage Works P2000 G3 Modular Smart Array System, manufactured by Hewlett-Packard Company, 3000 Hanover Street, Palo Alto, Calif., 94304, USA; or a Sony Pocket Bit USB Flash Drive, manufactured by Sony Corporation of America, 550 Madison Avenue, New York, N.Y., 10022.

The illustrated key management module 30 includes a deletion module 74 configured to delete each second half-key from the system such that the system is no longer able to decrypt encrypted transaction data associated with a particular account without cooperation from the entity associated with that particular account. Non-limiting examples of a deletion module may be a deletion module as described in U.S. Pat. No. 7,647,383; or a deletion module as described in U.S. Patent Publication No.: 2006/0101093, which references are incorporated for their supporting teachings herein.

Figure 10:
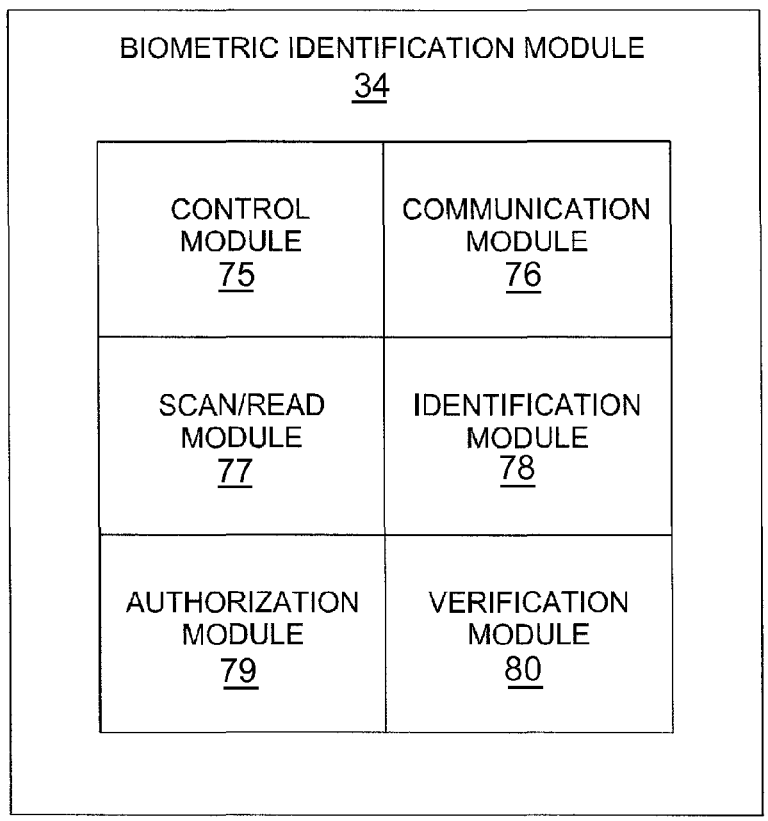
FIG. 10 is a module diagram of a biometric identification module, according to one embodiment of the invention.

FIG. 10 is a module diagram of a biometric identification module, according to one embodiment of the invention. There is shown a biometric identification module 34 including a control module 75, a communication module 76, a scan/read module 77, an identification module 78, an authorization module 79, and a verification module 80. Each illustrated module is in communication with other modules described herein to the degree needed and/or appropriate for performing the function(s) described herein that apply to the associated module. Such communication may be over a network, by shared memory addresses, passed variable, shared variables, over a bus, and the like and combinations thereof.

The illustrated biometric identification module 34 is configured to provide biometric verification of an entity associated with the account module. The biometric identification module 34 is configured to identify and manage biometric data associated with the trusted entity. Non-limiting examples of a biometric identification module may be a verification modules as described in U.S. Pat. No. 7,194,632; or a system as described in U.S. Patent Publication No. 2012/0250948, which references are incorporated for their supporting teachings herein.

The biometric identification module 34 includes a control module 75 configured to provide operational controls and instructions to the modules and components of the biometric identification module. The biometric identification module 34 also includes a communication module 76 configured to communicate with a computerized network. The communication module 76 is configured to provide communication capabilities, such as wireless communication, to the modules and components of the publishing module and the components and modules disposed therein.

The illustrated biometric identification module 34 includes a scan/read module 77 configured to scan or read a biometric identification of a user of an account, account module, or avatar. The scan/read module 77 may be configured to scan/read a biometric identification, such as but not limited to: fingerprints, eye scan, voice scan, voice recognition, etc. Non-limiting examples of a scan/read module may be a scan module as described in U.S. Pat. No. 8,279,042; or a scan module as described in U.S. Pat. No. 8,294,552, which references are incorporated for their supporting teachings herein.

The illustrated biometric identification module 34 includes an identification module 78 configured to store biometric identification data associated with an account, avatar, or account module. The identification module 34 is configured to store biometric identification data such as but not limited to fingerprints, eye scans, voice scan, voice recognition, etc.

The illustrated biometric identification module 34 includes an authorization module 79 configured to authorize access to the account module, accounts, and avatars. The authorization module 79 is configured to authorize transactions and transfers associated with the account module and the avatar module. The authorization module 79 is configured to verify data from a user attempting to access an account module or avatar module or to authorize a transaction or transfer associated with the account module. Non-limiting examples of an authorization module may be an authorization module as described in U.S. Pat. No. 7,853,993, issued to Vayman; or an authorization module as described in U.S. Pat. No. 7,753,265, issued to Harris, which references are incorporated for their supporting teachings herein.

The illustrated biometric identification module 34 includes a verification module 80 configured to verify account data, account module data, and avatar module data. Non-limiting examples of a verification module may be a verification module as described in U.S. Pat. No. 7,610,107, issued to Scharnick et al.; or a verification module as described in U.S. Pat. No. 7,194,632, issued to Guerin et al., which references are incorporated for their supporting teachings herein.

Figure 11:
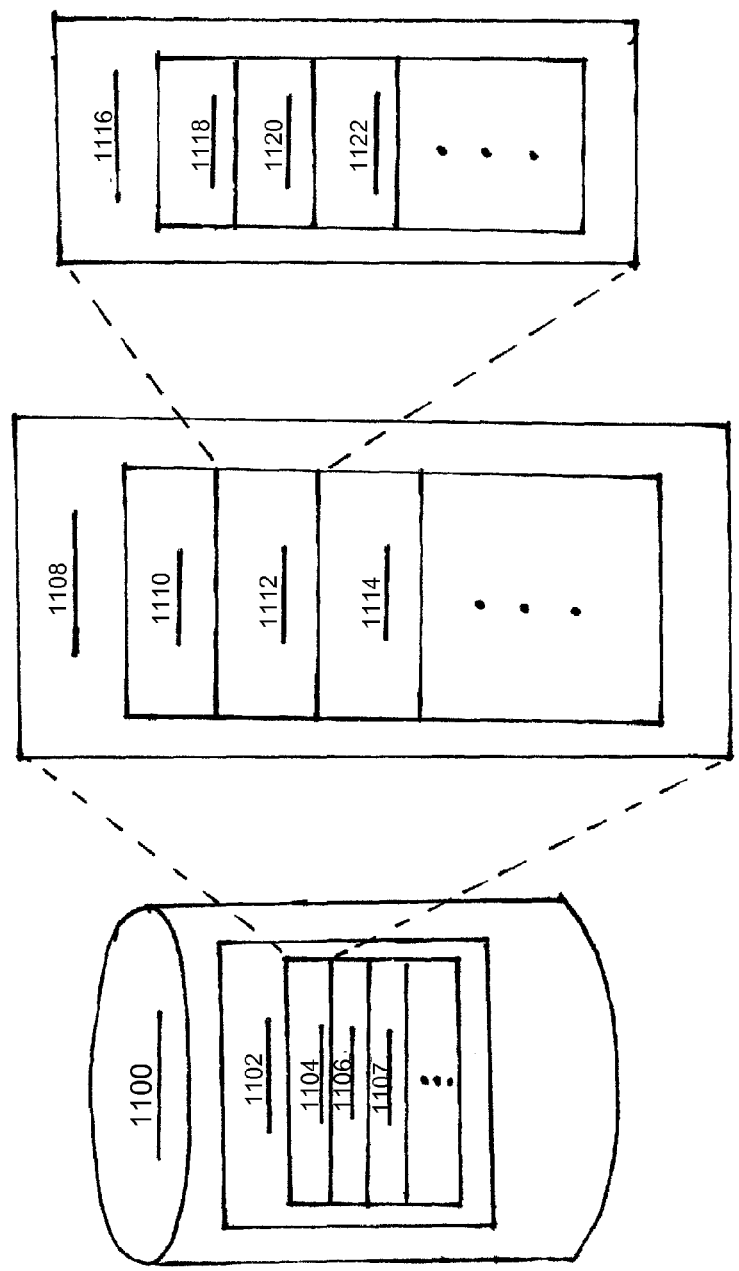
FIG. 11 is a data structure of a system, according to one embodiment of the invention.

FIG. 11 illustrates a data structure according to one embodiment of the invention. There is shown a memory device 1100 including entity data 1102 for each of a plurality of accounts 1104, 1106, 1107 and etc. The stored entity data 1108 for the top-most illustrated account 1104 includes trusted entity data 1110 along with a plurality of sets of inconsistent entity data 1112 (otherwise described herein as "avatars" and the like). The stored entity data 1108 also includes transaction and other data 1114. The illustrated avatars 1112 include a plurality of avatar data sets 1116 including avatars 1118, 1120, 1122 and etc. Other illustrated accounts may have similar data structures.

The illustrated memory device 1100 may include one or more memory devices such as but not limited to non-transitory memory devices such as but not limited to hard drives, solid state memory devices, magnetic-bit storage devices, DVD/CDROM, tape storage, RAM, ROM, and the like and combinations thereof. The memory device may include data storage management tools, such as but not limited to database software, operating systems, and the like and combinations thereof. The memory device may be in communication with one or more of the modules described herein over a bus, network, hardline connection, integration, and/or the like and combinations thereof.

The illustrated entity data 1102 includes information about and/or associated with a set of particular entities. Entities may include individuals, groups, companies, and etc. and are configured to permit such to act, publish, transact business, and the like in a manner that such activities are associated with the entity and/or may be accomplished for the benefit and/or credit of the entity. As a non-limiting example, entity data may include demographic, identifying, contact, historical, preference, banking, transaction preference, privacy preference, key, unique identifier, and/or other associated information and/or combinations thereof, including but not limited to stored entity data 1108 for each of a plurality of accounts 1104, 1106, 1107 and etc. The illustrated plurality of accounts 1104, 1106, 1107 and etc. organize some or all of the above listed information by account, wherein, each account generally would represent a unique entity. Such information or various portions thereof may be encrypted by various methods, including but not limited to encryption methods described herein.

The illustrated stored entity data 1108 includes trusted entity data 1110, avatar data 1112, and transaction and other data 1114. Accordingly, such information may be accessible as desired and/or necessary to perform one or more of the steps described herein, such as but not limited to being available for viewing and/or editing by representatives of the entity, account administrators, system administrators, parties transacting with the entity and the like and combinations thereof. Such information or various portions thereof may be encrypted by various methods, including but not limited to encryption methods described herein.

The illustrated trusted entity data 1110 includes data associated with and/or about the entity that has been through a certification process wherein the data is verified, audited, confirmed, validated, or otherwise submitted to a process configured to increase the level of trust which one may place in the information. Generally, such a process includes identification of another entity responsible for so processing the information and may also include information about the certainty level achieved, details of the certification process itself, any expiration dates of the certification, certification results, characteristics of the certified data (like identifying that the data is an accurate surname for the entity or that it is a blood type) and the like and combinations thereof.

In one non-limiting example, the certification process includes biometric identification of an individual by a medical professional and the trusted entity data includes information about such a process, including but not limited to a unique entity identifier for the medical professional (and/or associated business) that performed the process, biometric data obtained during the process (DNA profile, retinal scan data, fingerprint data, and/or etc.), the certified name of the individual associated with the biometric data, the date the certification process took place, and etc.

The illustrated plurality of sets of inconsistent data (avatars) 1112 include information associated with the entity/account that may be published to others. The term "inconsistent data" does not mean that the system requires or forces the data to be inconsistent, but instead that the system permits inconsistencies, at least to a degree. As a non-limiting example, in an account there may be a plurality of avatars for an individual named "Charles" but the avatars may list the name as any one or more of "Charles," "Chuck," "Jim," "aox33429," "SilverLight," and the like and combinations thereof. There may be a plurality of avatars that list/publish a consistent name, but others may be inconsistent with such a group. When avatars are used by a system to facilitate interaction(s), information included within the avatar is generally published to another system, entity, account, and/or avatar, such that the other is able to view some or all of the avatar information. Accordingly, the other may be able to treat the published avatar information as a representation of the entity, even if some of the information is obviously fictional or otherwise not entirely accurate.

The avatars 1112 may be organized and/or structured to permit a user to present one or more avatars to the system and/or to other systems for use during interactions with others. Avatars may be stored with preference data such that particular avatars may be automatically used in particular settings and/or with particular systems. As a non-limiting example, a user may always post to a particular website with an "Anonymous" avatar, may do banking with a "real" avatar that does not include any fictitious information, may purchase items with a "buyer" avatar that includes accurate information critical for execution of the purpose but also includes some fictitious information for purposes of detecting misuse of provided information, and the like and combinations thereof. There may be rules, preferences, or other management tools/controls stored in association with the stored avatars 1112 that govern their use. The illustrated transaction and other data 1114 are configured to store information associated with an account/entity for use by one or more modules herein.

In one non-limited example, there is a reputation score associated with an account/avatar and it may be that the reputation score is trusted information and/or it may be that the reputation score and/or a transformation thereof is not maskable by any avatar, such that an entity's/account's/avatar's reputation may be trusted and may carry from transaction to transaction.

The illustrated avatar data sets 1116, including avatars 1118, 1120, 1122 and etc. include sets of data about and/or associated with an entity that are then presented (published) to others during interactions or potential interactions therewith. Avatar data sets may also include, inherit, or otherwise be associated with trusted entity data. The following are non-limiting examples of data fields that may be included in one or more avatar data sets: name, address, email address, phone number, entity type, friends, nickname, unique avatar identifier, unique entity identifier, banking account, credit account, entity owner, avatar image, freeform description of avatar, freeform expression field, and the like and combinations thereof. Avatars may also be utilized in layers, wherein one or more avatars may be utilized in combination with each other while rules are applied to their associated use, such as but not limited to rules of data priority wherein data fields of higher priority avatars replace the associated data fields of lower priority avatars but null fields of such higher priority avatars make no such replacement, thereby the higher priority avatars act as a "mask" of sorts. It may be certain types of transactions require the use of a prime priority trusted information avatar as a mask that automatically replaces critical transaction necessary information with trusted information. The use of such a mask may be required based on preference information (or other information) of the other party to a transaction and/or based on transaction information.

In operation, the memory device facilitates storage and management of a plurality of accounts associated with entities in a manner that permits those entities to interact in customized ways and to store appropriate records of such interactions. Such customized interactions permit entities to experience a higher level of satisfaction, greater trust, control over privacy, and a more varied experience without having to have multiple accounts per entity.

Figure 12:
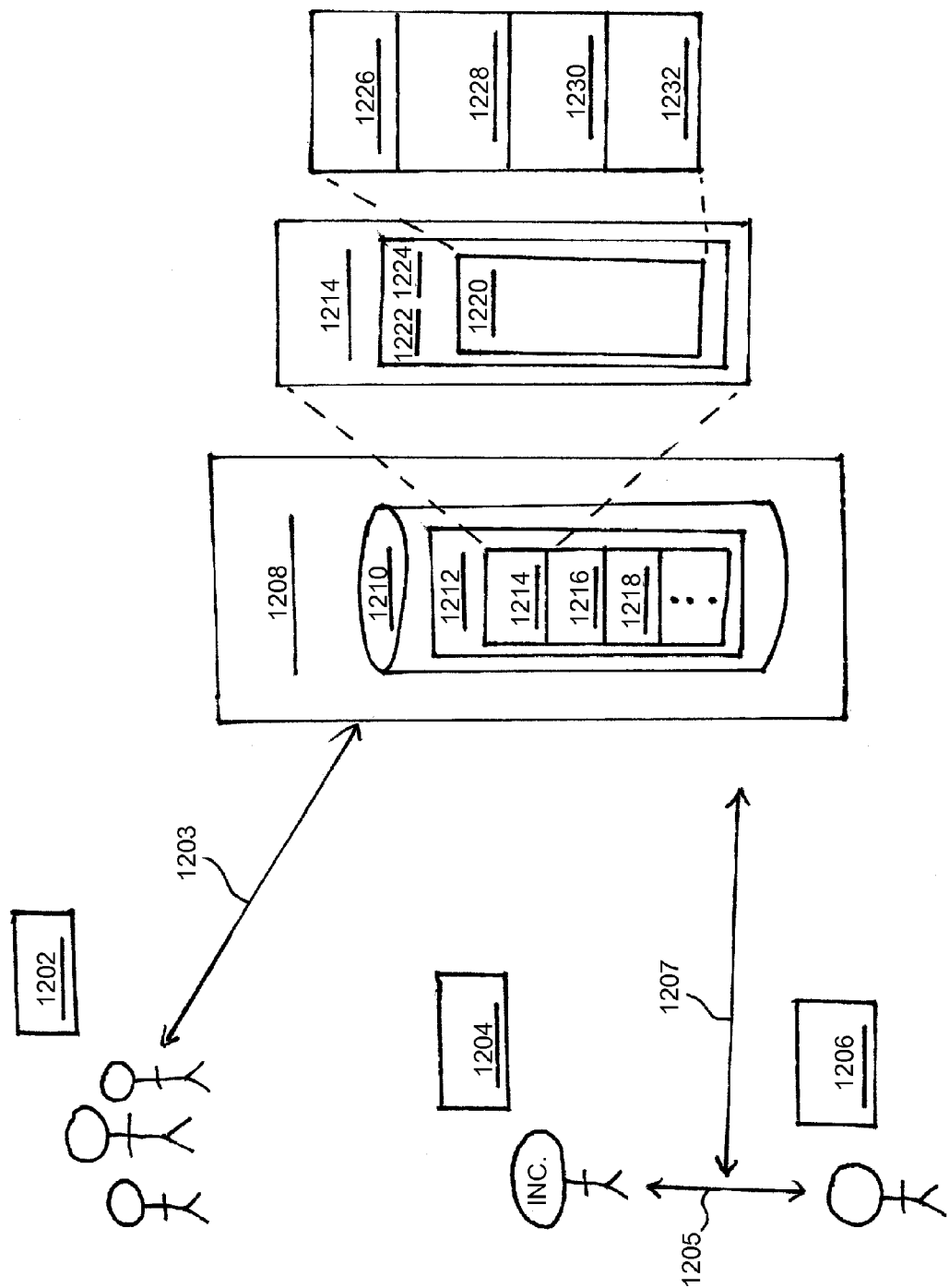
FIG. 12 is an operating data structure of a system, according to one embodiment of the invention.

FIG. 12 illustrates an operating data structure according to one embodiment of the invention. There is shown a plurality of entities (a group, a company and an individual) each associated with an account and/or avatar 1202, 1204, and 1206. These are in communication with each other and/or in communication with a system for storing data 1208. The system includes a data storage device 1210 that includes entity data 1212 for each of a plurality of accounts 1214, 1216, 1218, and etc. One of the illustrated accounts 1214 includes stored data 1220 that is encrypted by paired half-keys 1222 and 1224. The stored data 1220 includes a plurality of data sets 1226, 1228, 1230, and 1232.

The illustrated plurality of entities each associated with an account and/or avatar 1202, 1204, and 1206 may include one or more accounts and/or avatars within the illustrated system 1208 and/or may be from other systems not illustrated. Such accounts/avatars interact with the system 1208 and/or each other to permit interactions therebetween. In the illustrated example, the entity associated with account/avatar 1202 transacts 1203 directly with the system 1208, while the entities associated with accounts/avatars 1204 and 1206 transact 1205 with each other and the transaction is reported 1207 to the system 1208. Transactions may include exchanges, gifts, purchases, information transfers, permission granting, and the like and combinations thereof.

In the case of illustrated transaction 1203, the system may record some or all of the transaction information within an account reserved for the system as an entity. If privacy maximization is desired for exterior entities, the system may record only non-identifying information about the transaction, such as but not limited to item purchased, date, amount of transaction, and trusted information that cannot immediately identify the account/avatar 1202. Such may also include a half-key associated with the account/avatar 1202 wherein it is desired to encrypt the transaction data.

In the case of illustrated transaction 1205 the entities may perform their transaction with the help and/or knowledge of the system 1208 or without. The transaction is reported 1207 to the system in a manner that the system may associate it with one or more of the accounts/avatars 1204 and/or 1206. Such a reporting may include instructions about which account(s)/avatar(s) to associate the transaction with and information about the transaction. The information may also include one or more half-keys associated with the account(s)/avatar(s) 1204 and/or 1206 as appropriate.

The illustrated system for storing data 1208 may include one or more of the features, modules, systems, devices, and the like described herein and combinations thereof and/or may perform one or more of the functions, features, steps, processes and the like described herein. The system 1208 is in communication with accounts/avatars 1202, 1204, and 1206 and/or in communication with other systems. Such may be over a network or other communication systems/devices, such as but not limited to a point-of-transaction system (i.e. point-of-sale (POS) system, point-of-barter system, and etc.), online shopping cart system, social media management system (e.g. Facebook, Google+, LinkedIn, etc.), electronic communications system (email, chat, text, SMS, etc.) and the like and combinations thereof. The illustrated system is configured to store data of others. The illustrated system includes a processor and a data storage device, wherein the processor operates on data described herein and the data storage device stores the data and permits access thereto as appropriate. The illustrated data storage device 1210 is similar to the data storage device described in FIG. 11. The illustrated entity data 1212 is similar to the entity data described in FIG. 11. The illustrated plurality of accounts 1214, 1216, 1218, and etc. are similar to the plurality of accounts described in FIG. 11, except that one or more of the accounts/avatars 1202, 1204, and/or 1206 may be synonymous, associated with and/or included in the plurality of accounts 1214, 1216, 1218, and etc. As a non-limiting example, accounts 1216 and 1218 may be associated with avatars 1204 and 1206 respectively (wherein 1204 and 1206 are avatars) such that such are avatars of those accounts respectively.

The illustrated account 1214 includes stored data 1220 that is encrypted by paired half-keys 1222 and 1224. The stored data 1220 may include only transaction data and/or other data, such as data 1114 of FIG. 11, or may include additional or other data such as but not limited to trusted entity data, avatar data, name, address, email address, phone number, entity type, friends, nickname, unique avatar identifier, unique entity identifier, banking account, credit account, entity owner, avatar image, freeform description of avatar, freeform expression field, and the like and combinations thereof.

The illustrated paired half-keys 1222 and 1224 are generally a half-key provided by the system 1208 and a half-key provided by the associated entity. Such a half-key may be a hash of a biometric identification or otherwise associated with some data storage on or carried by the entity. Such may be encoded on a card carried by the entity, generated by a functional transformation of fingerprint or retinal scan of the individual, included in a chip embedded within the entity or the like or combinations thereof. Wherein the system is intended to be involved in the decryption of the stored data in cooperation with the associated entity, one of the half-keys will be a system half-key that may be common (the same) to other half-keys used for other entities. Accordingly, the system may keep a low number (perhaps even just one) encryption keys, thereby reducing its administrative overhead (electronic and financial). Wherein an entities half-key is compromised, the system can still refuse access to the data, thereby continuing to protect the data. However, if the system's key is compromised or it is required to provide the same to another entity, the data is still protected unless cooperation of the associated entity is acquired. Further, compromise of the system's half-key and the entity's half-key does not compromise the data of the system, but instead only that data associated with that particular entity. Since the system does not store half-key data of particular entities, it is not possible for an outside group to easily acquire access to the entire data pool of the system.

Wherein the system is not intended to be involved in decryption of the stored data associated with a pair of entities, each of their respective half-keys may be utilized in encrypting the stored data. In such a situation, the stored data would only be accessible by cooperation of both entities and access to the system half-key would not be any assistance in gaining meaningful access to the data.

The illustrated plurality of data sets 1226, 1228, 1230, and 1232 may include records of transactions, data that has value, banking/credit information sufficient to access funds, contact information, inventory records, trusted entity data, certified statements of others, certification records, and the like and combinations thereof.

Figure 13:
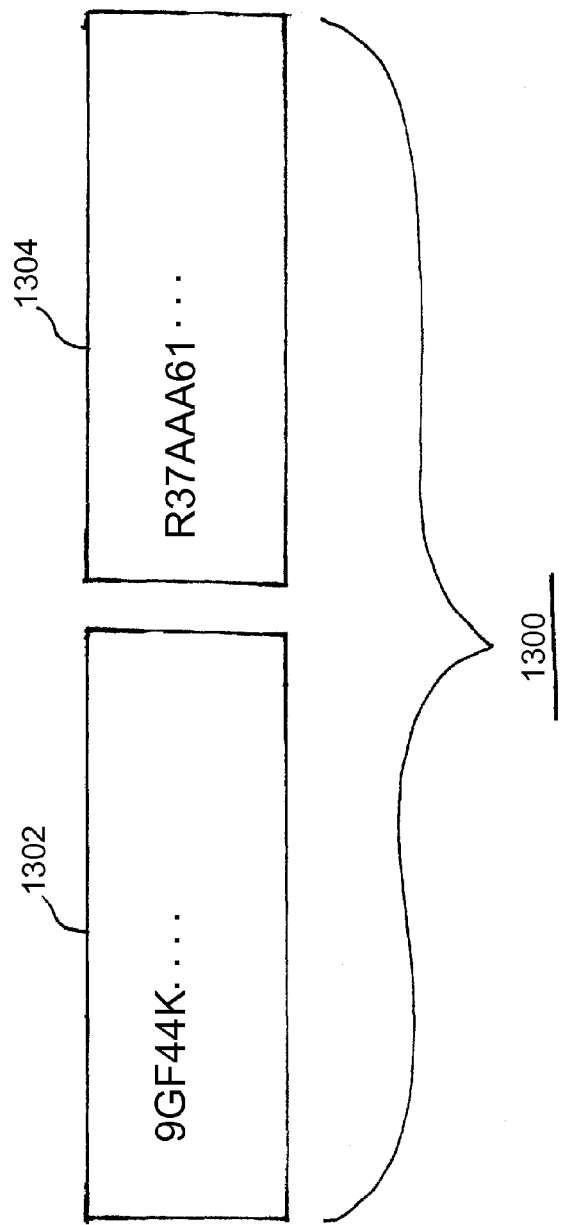
FIG. 13 is an exemplary pair of half-keys of a system, according to one embodiment of the invention.

FIG. 13 illustrates an exemplary pair 1300 of half-keys. In the illustrated example, the half-keys 1302 and 1304 are represented by alpha-numeric digits. The illustrated example does not specify particular key lengths of either of the half-keys. The half-keys may be of identical length or may be of diverse lengths. The length of each half-key may be unlimited by the system and/or unspecified by the system. However, wherein one of the half-keys is a system common half-key used by the system across multiple accounts, the length of that key would generally remain the same across usage. Wherein a particular key-length is desired, the system key may be repeated and/or truncated according to a predefined algorithm during the decryption process. It may be that various accounts have varying half-key lengths, and therefore knowledge of the system common half-key may only give partial information about its use until the associated entity specific half-key is provided, thus making cracking the encryption even more difficult with only one half-key.

It is understood that half-keys may vary in substance and may be subject to transformation during the encryption/decryption process. As a non-limiting example, a half-key may be alpha-numeric, binary, hexadecimal, alphabetical, and/or recorded/presented according to some other data system. Further, paired-half keys need not be recorded in the same system, though they will generally need to be transformed to a usable form during encryption/decryption.

Figure 14:
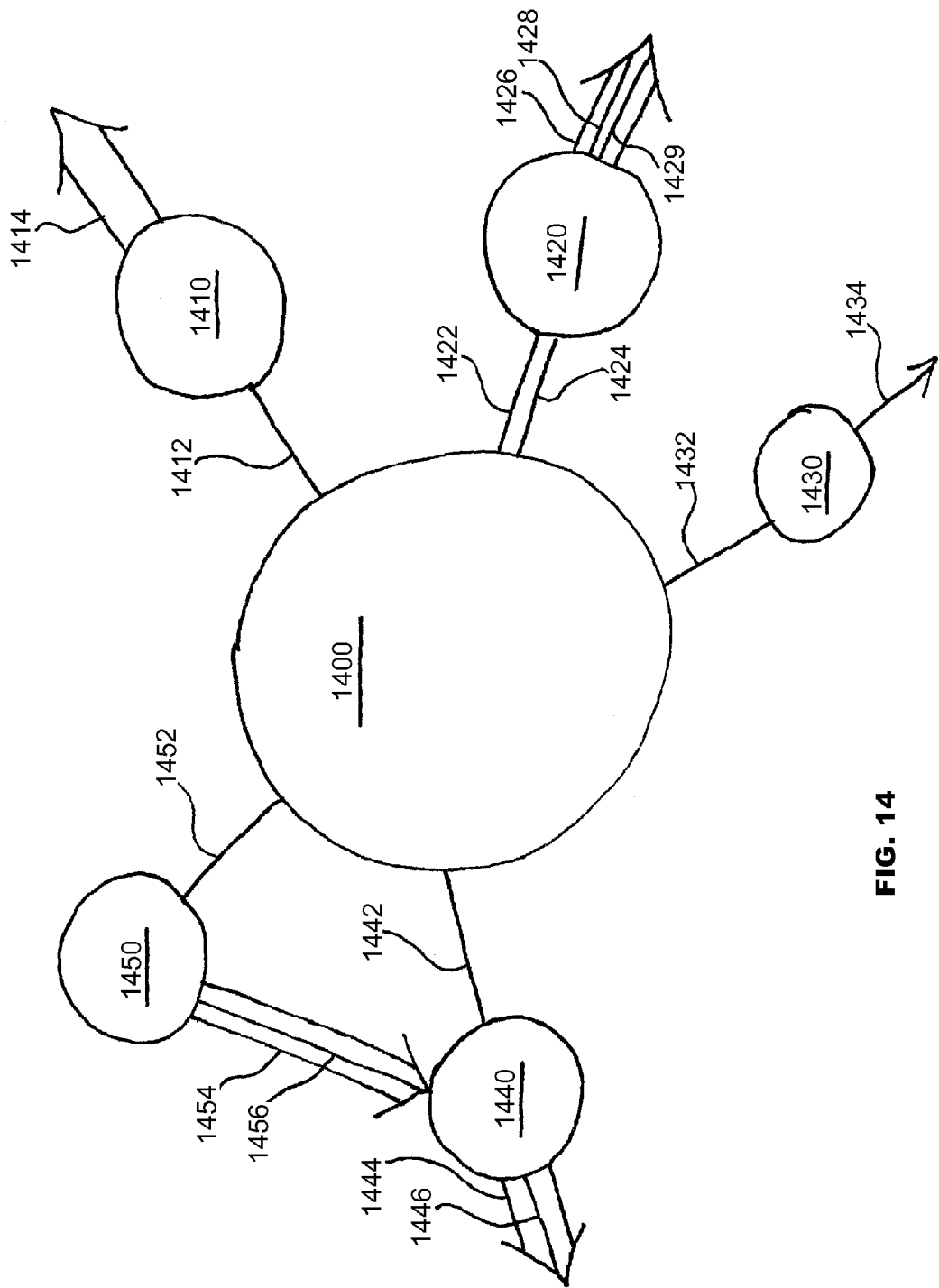
FIG. 14 is an account including a plurality of avatars of a system, according to one embodiment of the invention.

FIG. 14 illustrates an account 1400 having a plurality of avatars 1410, 1420, 1430, 1440, and 1450 associated therewith and passing trusted entity data sets 1412, 1422, 1424, 1432, 1442, and 1452 as illustrated. The respective illustrated avatars publish information 1414, 1426, 1428, 1429, 1434, 1444, 1446, 1454, and 1456 as illustrated and in particular, avatar 1450 publishes information to avatar 1440, thereby illustrating the ability of avatars of a single entity to interact and/or transact.

The illustrated account 1400 is similar to the account described in FIGS. 11 and 12 and is associated with a particular entity. The account 1400 includes trusted information and manages a plurality of avatars 1410, 1420, 1430, 1440 and 1450.

The illustrated avatar 1410 receives or is otherwise able to access trusted information 1412 from its parent account 1400 and publishes information 1414 in the illustrated example. The published information 1414 of avatar 1410 does not include trusted information 1412, though such may be available to the avatar to provide on request or to perform one or more functions using the trusted information within the function. As a non-limiting example, the avatar may browse an online store for merchandise and may internally filter search results according to the gender of the entity (trusted data) but may choose to not publish that information when accessing such websites unless specifically requested or may withhold it completely.

The illustrated avatar 1420 receives or is otherwise able to access trusted information 1422 and 1424 from its parent account 1400 and publishes information 1426, including information 1428, and 1429 in the illustrated example. The published information 1434 includes user defined information that may be true or fictional and also includes trusted information that is either identical to trusted information 1422 and 1424 or merely a reformatting and/or transformation of the same. Such a transformation in the illustrated example may include one or more combinations of the plurality of trusted data accessible to the avatar. As a non-limiting example, the trusted information may include information about a bank account 1422 and about a credit account 1424 of the associated entity and the published trusted information may include confirmation that the avatar has access to both credit and debit funds 1428 and a total trusted limit of available financial resources of the combined accounts. Entities/modules receiving such trusted information may be able to confirm the received data with the system associated with the account 1400 through a confirmation process that may include providing trusted information identifiers along with received/published information for verification with the system. The account may provide one or more trusted information identifiers together with the associated trusted information and that may be passed with publishing the information. Such trusted information identifiers may also include avatar/account identifiers associated with entities responsible for certifying the associated data, such as but not limited to doctors, banks, credit institutions, membership clubs, government agencies, and the like and combinations thereof. Accordingly, third parties may be able to identify who can verify the validity and accuracy of trusted information without having to know other information about the entity behind the avatar, especially but not limited to personally identifying information of the entity.

The illustrated avatar 1430 receives or is otherwise able to access trusted information 1432 from its parent account 1400 and publishes only information 1434 in the illustrated example. The published information 1434 is either identical to trusted information 1432 or merely a reformatting and/or transformation of the same. As a non-limiting example, the published information may be merely that the avatar has a valid credit account with a limit greater than a specified lower limit required for a particular interaction/transaction.

The illustrated avatars 1440 and 1450 receive or are otherwise able to access trusted information 1442 and 1452 respectively from their parent account 1400 and each publish information 1444 and 1454 respectively in the illustrated example, including trusted information 1446 and 1456 respectively. Additionally, avatar 1440 receives or otherwise has access to published information 1454 (including trusted information 1456) of avatar 1450. The published information 1444 and 1454 includes user defined information that may be true or fictional and also includes trusted information that is either identical to trusted information 1442, 1452 and/or 1456 or merely a reformatting and/or transformation of the same. Such a transformation in the illustrated example may include one or more combinations of the plurality of trusted data accessible to the avatar(s). As a non-limiting example, avatar 1450 may be an avatar generally used in interactions with health care professionals and its trusted information 1452 may include a great deal of private medical information, while avatar 1440 may be an avatar used to interface with insurance companies and its trusted information may be financial information of the entity used to pay premiums. The trusted information 1446 published by avatar 1440 may include only the limited financial and medical information needed to request payment of insurance claims to health-care providers associated with the entity. Accordingly, avatar 1440 acts as a mask/filter for protecting trusted information that might be inappropriately provided by mere use of avatar 1450. Avatars may be stacked in an unlimited set of layers in this manner.

Figure 15:
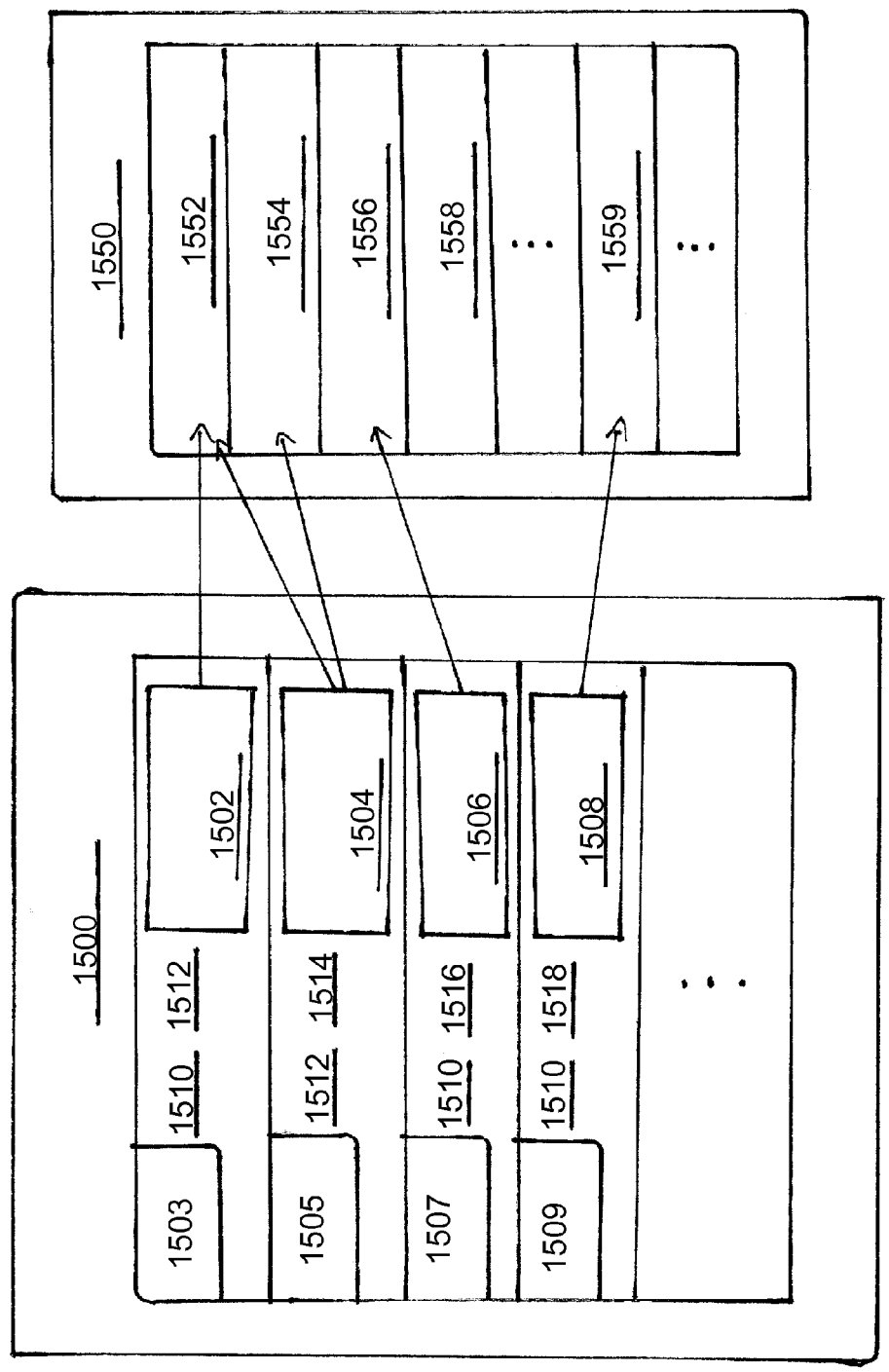
FIG. 15 is a transaction storage module of a data storage module of a data storage system, according to one embodiment of the invention.

FIG. 15 illustrates a transaction storage module 1500 of a data storage module of a data storage system and its association with a plurality of account modules 1550 of a data storage system. In the non-limiting illustrated example, the transaction storage module 1500 includes a plurality of stored transactions (or merely stored data) 1502, 1504, 1506 and 1508 that are each encrypted by paired half-keys as illustrated. The illustrated stored data 1502, 1504, 1506 and 1508 each include unencrypted data 1503, 1505, 1507 and 1509 respectively that may include data required to manage, sort, store, manipulate, identify, index and/or otherwise use the stored data as needed, desired or otherwise indicated herein.

The illustrated data 1502 is encrypted by use of half-keys 1510 and 1512. Key 1510 is a key that is common to other encrypted data that is associated with other accounts. Key 1512 is associated with account 1552 and will generally be a transformation of biometric data, such as but not limited to a hash of data received from a fingerprint sensor. Data 1502 is associated with account 1552.

The illustrated data 1504 is encrypted by use of half-keys 1512 and 1514 and notably does not include the common key 1510. Key 1512 is associated with account 1552 and will generally be a transformation of biometric data, such as but not limited to a fingerprint hash. Key 1514 is associated with account 1554 and will generally be a transformation of biometric data, such as but not limited to a fingerprint hash. Data 1504 is associated with accounts 1552 and 1554.

The illustrated data 1506 is encrypted by use of half-keys 1510 and 1516. Key 1510 is a key that is common to other encrypted data that is associated with other accounts. Key 1516 is associated with account 1556 and will generally be a transformation of biometric data, such as but not limited to a hash of data received from a fingerprint sensor. Data 1506 is associated with account 1556.

The illustrated data 1508 is presented to make clear that stored data need not be sequentially associated with accounts and is illustrated as being encrypted by use of half-keys 1510 and 1518. Key 1510 is a key that is common to other encrypted data that is associated with other accounts. Key 1518 is associated with account 1559 and will generally be a transformation of biometric data, such as but not limited to a hash of data received from a fingerprint sensor. Data 1508 is associated with account 1559.

Figure 16:
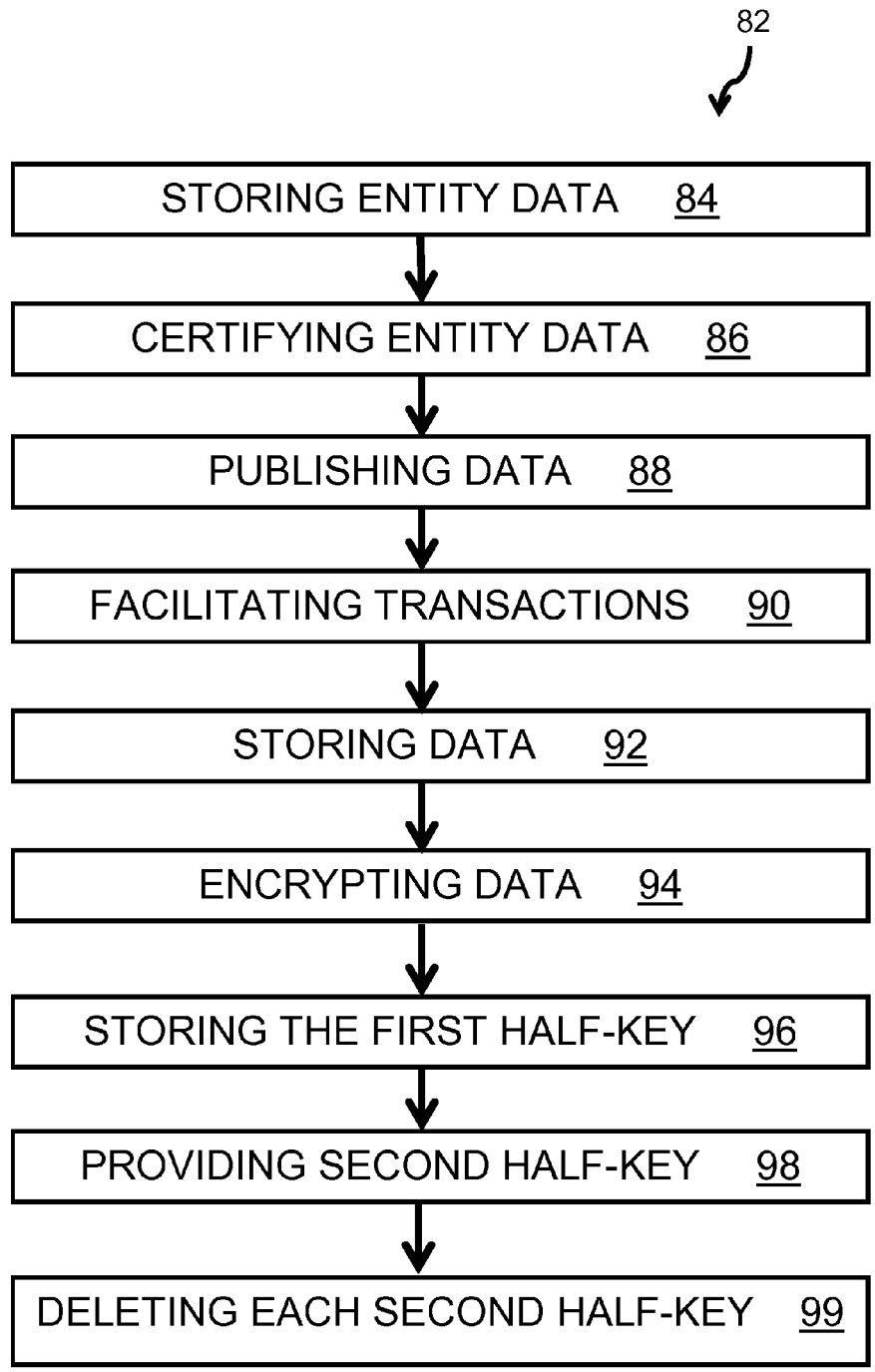
FIG. 16 is a flow chart of a method of storing data using a data storage system, according to one embodiment of the invention.

FIG. 16 is a flow chart of a method of storing data using a data storage system, according to one embodiment of the invention.

The illustrated method of storing data of others on a computerized system having a processor 82. The method 82 includes the step of storing, in a memory device, entity data for each of a plurality of accounts and in association therewith thereby forming stored entity data for each account, wherein each account is associated with an entity 84.

The method 82 includes certifying a portion of the stored entity data, thereby generating trusted entity data associated with each account 86. The method 82 also includes the step of publishing a plurality of inconsistent sets of entity data (avatars) for each of a plurality of accounts, wherein each inconsistent set of entity data includes trusted entity data that is consistent among publications but also includes user defined data that is inconsistent among publications 88. The trusted entity data is not personally identifying of the entity associated with its account, i.e. the trusted entity data does not expose the identity of the entity, but is still personal to the identity and provides sufficient information for a trusted transaction with the same.

The method of storing data of others on a computerized system having a processor 82 includes the step of facilitating a plurality of transactions using trusted entity data, thereby generating transaction data associated with the plurality of accounts 90. The step of facilitating a plurality of transactions 90 includes publishing user selected entity data that is not trusted and identifying trusted entity data as being trusted. The method 82 includes storing, in a memory device, the transaction data in association with its associated accounts 92. The method 82 also includes the step of encrypting, using a processor, the transaction data with a plurality of paired half-keys, one pair for each account wherein encryption process is performed by applying a paired half-key of a particular account to transaction data that is associated with that particular account, each paired half-key may include a first half-key that is common to the paired half keys of the plurality of accounts; and a second half-key that is unique among the half-keys of the plurality of accounts 94.

The method of storing data of others on a computerized system having a processor 82 includes the step of storing the first half-key 96. The method 82 includes the step of providing each entity with their associated second half-key 98 (generally associated with or generable from biometric data that may be acquired from the entity associated with the account). The method 82 includes the step of deleting each second half-key such that the computerized system is no longer able to decrypt encrypted transaction data associated with a particular account without cooperation from the entity associated with that particular account 99 (generally by scanning biometric data from the entity again).

The method of storing data of others on a computerized system having a processor 82 includes the step of encrypting personally identifying entity data of an account with its associated paired half-key. The method 82 also includes the step of initiating a transaction using the first half-key and a second half-key to authenticate and verify account data. The method of storing data of others on a computerized system having a processor 82 includes the step of verifying biometric data associated with an account and associating a second half-key therewith. The method may include the step of storing a reputation score associated with an account and certifying the stored reputation score, thereby generating trusted reputation data.

In one non-limiting embodiment, some or all data is encrypted with merely the second half-key and not with the first half-key. Alternatively, data may be stored multiple times, and encrypted with only one key, such that the same data may be accessible by either the system or the entity without cooperation of the other. In such an embodiment, the cooperation of the system is not needed to decrypt the stored data and the entity associated with the data may do so as desired. Further, security breaches with regards to the first half-key will be no threat to data stored in such a manner.

In one non-limiting embodiment, second half-keys may be assigned to specific avatars of an entity, such that an entity may have a plurality of second half-keys and may even have some avatars that use no keys at all. Further, keys may be chosen by the entity and/or may be assigned by the system.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the present application discusses specific contexts in which the invention may be practiced, it is understood that the invention may be practiced in any context in which the storage of data for others is desired.

Additionally, although the figures illustrate specific combinations of modules within the system and specific sub-configurations of modules, it is understood that the exact grouping of such modules is generally for purposes of helping comprehension of the invention and that other functional configurations are plethoric and included within the scope of the invention unless otherwise specifically limited by the claims.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A method of storing data of others on a computerized system having a processor, comprising the steps of:
   a) storing, in a memory device, entity data for each of a plurality of accounts and in association therewith thereby forming stored entity data for each account, wherein each account is associated with an entity;
   b) certifying a portion of the stored entity data, thereby generating trusted entity data associated with each account;
   c) publishing a plurality of inconsistent sets of entity data for each of a plurality of accounts, wherein each inconsistent set of entity data includes trusted entity data that is consistent among publications but also includes user defined data that is inconsistent among publications;
   d) facilitating a plurality of transactions using trusted entity data, thereby generating transaction data associated with the plurality of accounts;
   e) storing, in a memory device, the transaction data in association with its associated accounts;
   f) encrypting, using a processor, the transaction data with a plurality of paired half-keys, one pair for each account wherein encryption process is performed by applying a paired half-key of a particular account to transaction data that is associated with that particular account, each paired half-key including:
      f1) a first half-key that is common to the paired half keys of the plurality of accounts; and
      f2) a second half-key that is unique among the half-keys of the plurality of accounts;
   g) storing the first half-key;
   h) providing each entity with their associated second half-key; and
   i) deleting each second half-key such that the computerized system is no longer able to decrypt encrypted transaction data associated with a particular account without cooperation from the entity associated with that particular account.

2. The method of claim 1, wherein the step of facilitating a plurality of transactions further comprises publishing user selected entity data that is not trusted and identifying trusted entity data as being trusted.

3. The method of claim 1, further comprising encrypting personally identifying entity data of an account with its associated paired half-key.

4. The method of claim 1, further comprising initiating a transaction using the first half-key and a second half-key to authenticate and verify account data.

5. The method of claim 1, further comprising verifying biometric data associated with an account and associating a second half-key therewith.

6. The method of claim 1, further comprising storing a reputation score associated with an account and certifying the stored reputation score, thereby generating trusted reputation data.

7. The method of claim 1, wherein trusted entity data is not personally identifying of the entity associated with its account.

8. A method of storing data of others on a computerized system having a processor, comprising the steps of:
   a) storing, in a memory device, entity data for each of a plurality of accounts and in association therewith thereby forming stored entity data for each account, wherein each account is associated with an entity;
   b) certifying a portion of the stored entity data, thereby generating trusted entity data associated with each account;
   c) facilitating a plurality of transactions using trusted entity data, thereby generating transaction data associated with the plurality of accounts;
   d) storing, in a memory device, the transaction data in association with its associated accounts;
   e) encrypting, using a processor, the transaction data with a plurality of paired half-keys, one pair for each account wherein encryption process is performed by applying a paired half-key of a particular account to transaction data that is associated with that particular account, each paired half-key including:
      e1) a first half-key that is common to the paired half keys of the plurality of accounts; and
      e2) a second half-key that is unique among the half-keys of the plurality of accounts;
   f) storing the first half-key;
   g) providing each entity with their associated second half-key; and
   h) deleting each second half-key such that the computerized system is no longer able to decrypt encrypted transaction data associated with a particular account without cooperation from the entity associated with that particular account.

9. The method of claim 8, further comprising encrypting personally identifying entity data of an account with its associated paired half-key.

10. The method of claim 9, further comprising initiating a transaction using the first half-key and a second half-key to authenticate and verify account data.

11. The method of claim 10, further comprising verifying biometric data associated with an account and associating a second half-key therewith.

12. The method of claim 11, wherein trusted entity data is not personally identifying of the entity associated with its account.

13. The method of claim 12, further comprising storing a reputation score associated with an account and certifying the stored reputation score, thereby generating trusted reputation data.

14. The method of claim 13, wherein the step of facilitating a plurality of transactions further comprises publishing user selected entity data that is not trusted and identifying trusted entity data as being trusted.

15. The method of claim 13, further comprising publishing a plurality of inconsistent sets of entity data for each of a plurality of accounts, wherein each inconsistent set of entity data includes trusted entity data that is consistent among publications but also includes user defined data that is inconsistent among publications.

16. A system for storing data of others using a processor and a memory device, comprising:
   a) an account module configured to manage a plurality of accounts, each account associated with an entity;
   b) a data storage module in communication with the account module and configured to store data and storing entity data for each of the plurality of accounts and in association therewith thereby forming stored entity data for each account;
   c) a certification module in communication with the data storage module and configured to certify a portion of the stored entity data, thereby generating trusted entity data associated with each account;
   d) an avatar module in communication with each of the certification module and the data storage module and configured to permit entities to generate avatars for their accounts, wherein an avatar associates data with an account that is not required to be consistent with the account and not required to be consistent with data in other avatars of that same account;
   e) a publishing module in communication with the avatar module and configured to publish a plurality of avatars and wherein each published avatar includes trusted entity data;
   f) a transaction module in communication with the data storage module and configured to facilitate a plurality of transactions using trusted entity data, thereby generating transaction data associated with the plurality of accounts;
   g) an encryption module in communication with the data storage module and configured to encrypt, using a processor, the transaction data with a plurality of paired half-keys, one pair for each account wherein encryption process is performed by applying a paired half-key of a particular account to transaction data that is associated with that particular account, each paired half-key including:
      g1) a first half-key that is common to the paired half keys of the plurality of accounts; and
      g2) a second half-key that is unique among the half-keys of the plurality of accounts; and
   h) a key management module configured to store the first half-key, provide each entity with their associated second half-key, and delete each second half-key from the system such that the system is no longer able to decrypt encrypted transaction data associated with a particular account without cooperation from the entity associated with that particular account.

17. The system of claim 16, further comprising an authentication module in communication with the account module and configured to provide account authentication during transactions.

18. The system of claim 16, further comprising a biometric identification module in communication with the account module and configured to provide biometric verification of an entity associated with the account module.

19. The system of claim 16, wherein the encryption module encrypts personally identifying entity data of an account with its associated paired half-key.

20. The system of claim 16, wherein trusted entity data is not personally identifying of the entity associated with its account.

* * * * *